US012793189B2

(12) United States Patent
Agrawal et al.

(10) Patent No.: US 12,793,189 B2
(45) Date of Patent: Nov. 10, 2026

(54) RECONSTRUCTING DESCRIPTIVE VISUAL INFORMATION IN AN OBSTRUCTED IMAGE VIA ACCESSING SECOND PARTY DATA

(71) Applicant: MOTOROLA MOBILITY LLC, Wilmington, DE (US)

(72) Inventors: Amit Kumar Agrawal, Bangalore (IN); Krishnan Raghavan, Bangalore (IN); Nakul Patel, Nagpur (IN)

(73) Assignee: Motorola Mobility LLC, Chicago, IL (US)

( * ) Notice: Subject to any disclaimer, the term of this patent is extended or adjusted under 35 U.S.C. 154(b) by 168 days.

(21) Appl. No.: 18/948,114

(22) Filed: Nov. 14, 2024

(65) Prior Publication Data

US 2026/0134525 A1 May 14, 2026

(51) Int. Cl.
*G06T 5/77* (2024.01)
*G06T 3/06* (2024.01)
*G06T 7/70* (2017.01)

(52) U.S. Cl.
CPC .................. *G06T 5/77* (2024.01); *G06T 3/06* (2024.01); *G06T 7/70* (2017.01)

(58) Field of Classification Search
CPC ................ G06T 5/77; G06T 3/06; G06T 7/70
USPC .......................................................... 382/275
See application file for complete search history.

(56) References Cited

U.S. PATENT DOCUMENTS 12,293,000 B2 * 5/2025 Gustof ................ G06F 21/6245
2023/0222757 A1 * 7/2023 Beith .................. G06F 21/6245 382/103
2023/0237674 A1 * 7/2023 Heimer ..................... G06T 7/20 382/103
2023/0237757 A1 * 7/2023 Mishra ................... G06V 10/25 382/159
2023/0281769 A1 * 9/2023 Nanjegowd .......... G11B 27/031 382/284

* cited by examiner

*Primary Examiner* — Asmamaw G Tarko
(74) *Attorney, Agent, or Firm* — Isidore PLLC

(57) ABSTRACT

An electronic device, a method, and a computer program product provide more realistic and accurate image editing by retrieving and reconstructing descriptive information obstructed in an image. The electronic device identifies and delineates an obstruction to be replaced in the image. The electronic device identifies, in the image, descriptive information that is not obstructed and has identifying indications of a transaction second party and other transaction identifying aspect(s). The electronic device identifies a format of an example physical transaction record matching a partial format of the descriptive information. Based on the format and the unobscured descriptive information, the electronic device retrieves from a network source the descriptive information associated with the transaction and obscured from the image and inpaints the retrieved descriptive information to reconstruct an unobstructed first image.

20 Claims, 15 Drawing Sheets

RECONSTRUCTING DESCRIPTIVE VISUAL INFORMATION IN AN OBSTRUCTED IMAGE VIA ACCESSING SECOND PARTY DATA

CROSS REFERENCE TO RELATED APPLICATIONS

The present application is related to commonly owned U.S. patent application filed on even date herewith and entitled "Reconstructing Obstructed Visual Information in an Image", having the same named inventors, the disclosure of which is hereby incorporated by reference in its entirety.

BACKGROUND

1. Technical Field

The present disclosure relates generally to electronic devices that present images, and more particularly to electronic devices with tools for digitally editing images.

2. Description of the Related Art

Photo editing has significantly evolved from manual darkroom techniques to advanced digital processes. Manual darkroom techniques involve physical manipulation of film and prints, a labor-intensive and time-consuming task. The introduction of software digital photo editing transformed photo editing, making it more accessible and versatile. Electronic devices such as smartphones, laptops, and tablets may include photo editing software.

BRIEF DESCRIPTION OF THE DRAWINGS

The description of the illustrative embodiments can be read in conjunction with the accompanying figures. It will be appreciated that for simplicity and clarity of illustration, elements illustrated in the figures have not necessarily been drawn to scale. For example, the dimensions of some of the elements are exaggerated relative to other elements. Embodiments incorporating teachings of the present disclosure are shown and described with respect to the figures presented herein, in which.

DETAILED DESCRIPTION

Figure 1:
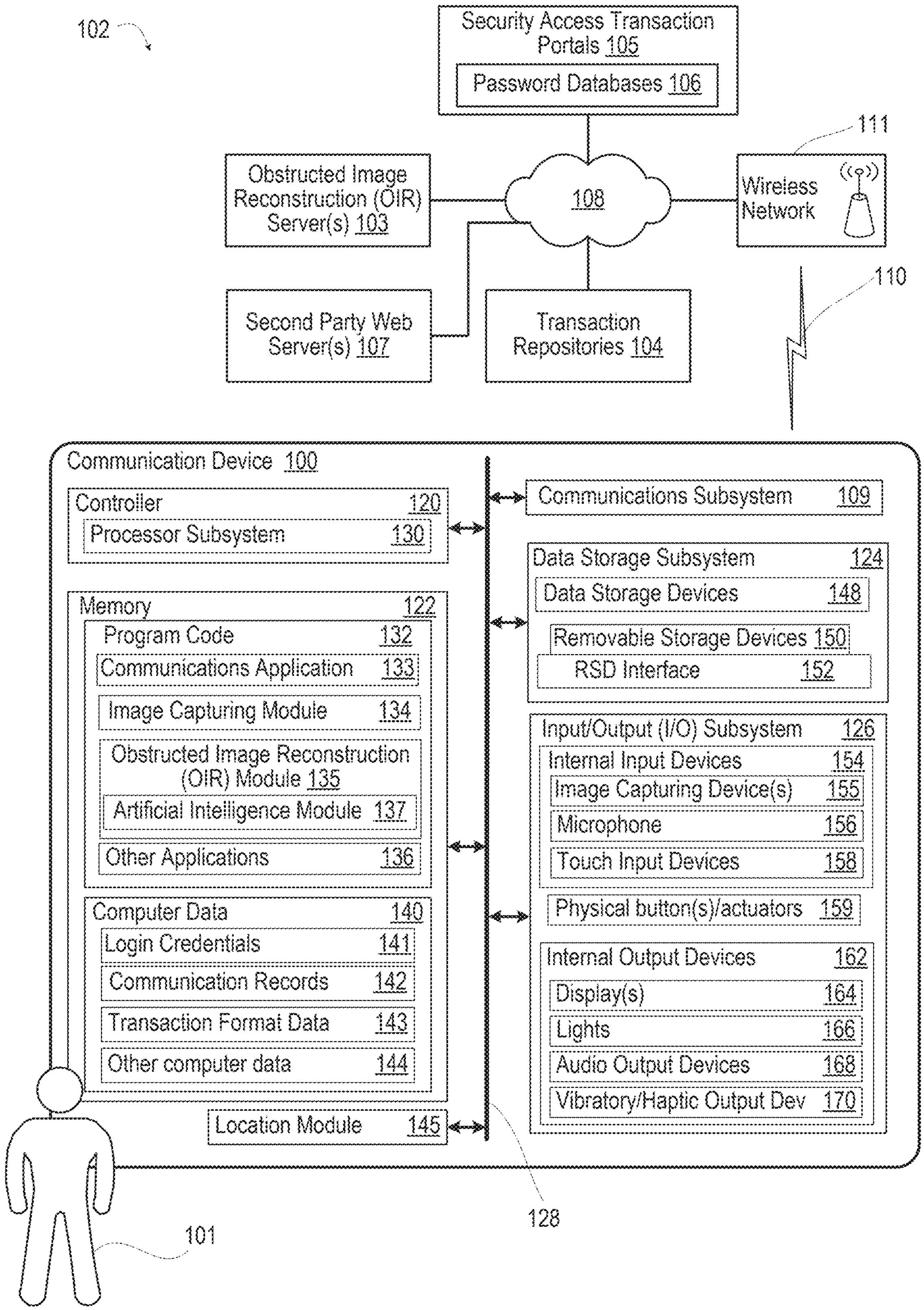
FIG. 1 presents a simplified functional block diagram of a communication device in which the features of the present disclosure are advantageously implemented for reconstructing descriptive information that is at least partially obscured or was not captured in an image due to an obstruction, according to one or more embodiments.

According to aspects of the present disclosure, an electronic device, a method and a computer program product provide techniques for performing more realistic and accurate image editing by reconstructing descriptive information that was not captured in the image due to an obstruction or skewing. Conventional photo editing software relies upon information from only within the image for reconstructing a realistic background/foreground within an erased portion of the image. Some photo editing software has incorporated artificial intelligence (AI) technology capable of erasing items in a photographic image and automatically adding new elements to fill the erasure, creating a natural looking image without the erased items. This process does not provide a good result, particularly when the object being removed and replaced with a copy of another part of the image is descriptive information within the in-focus foreground/background image. For example, replacing text that is partially erased or obscured with a plain background or foreground patch matching the remainder of the image creates a glaring inaccuracy in the edited image. According to one or more aspects of the present disclosure, the descriptive information that is obscured in the image is retrieved from another source having the original details and incorporated into the image to achieve a more realistic and accurate reconstruction.

In one or more embodiments, the electronic device includes a memory that stores an image obstruction mitigation module and at least one communication application. The electronic device includes a communications subsystem connectable to a communication network. A processor of the electronic device is communicatively coupled to the memory and the communications subsystem. In response to a trigger to reconstruct a first image of a physical transaction record having content that is partially obstructed/obscure, the processor is configured to cause the electronic device to identify in the first image an obstruction that is obfuscating a section of the first image. The processor is configured to cause the electronic device to identify at least one first portion of descriptive information on another section of the first image that is unobstructed. The descriptive information includes identifying indications of a transaction second party and at least one transaction identifying aspect. The processor is configured to cause the electronic device to identify a first format of an example physical transaction record, at least in part based on matching a partial format of the descriptive information to an example format of the example physical transaction record. The processor is configured to cause the electronic device to identify, based on the first format, at least one category of transaction information of the descriptive information obscured in the section of the first image. The processor is configured to cause the electronic device to retrieve, via the communications subsystem from a network source, information corresponding to, or enabling determination of, the at least one category of the descriptive information obscured from the first image due to the obstruction. The processor is configured to cause the electronic device to delineate the first image into multiple segments comprising at least one first segment encompassing the section with the obstruction, and which separates the obstruction from at least one second segment encompassing a visible portion of the other section of the first image that is unobstructed. The processor is configured to cause the electronic device to reconstruct an unobstructed first image by inpainting, in the at least one first segment of the first image, at least one second portion of descriptive information that was hidden by the obstruction in the first image, the at least one second portion of descriptive information determined based on the information retrieved from the network source.

The present disclosure locates or determines original information that is obstructed in an image and replaces the obstruction with the correct original information, enhancing visual appeal and completeness of images when undesired obstructions are removed and replaced in the images with digital editing. Unlike simple visual extrapolation types of photographic editing, the present disclosure provides techniques for identifying descriptive information that is unobstructed in the image and uses that information to locate and retrieve missing descriptive information from network sources. Reconstructing an image having missing text, for example, requires more than just visual cues. Contextual understanding of what is missing and identifying other sources for the missing descriptive information is required.

In the following detailed description of exemplary embodiments of the disclosure, specific exemplary embodiments in which the various aspects of the disclosure may be practiced are described in sufficient detail to enable those skilled in the art to practice the invention, and it is to be understood that other embodiments may be utilized and that logical, architectural, programmatic, mechanical, electrical, and other changes may be made without departing from the spirit or scope of the present disclosure. The following detailed description is, therefore, not to be taken in a limiting sense, and the scope of the present disclosure is defined primarily by the appended claims and equivalents thereof. Within the descriptions of the different views of the figures, similar elements can be provided with similar names and reference numerals as those of the previous figure(s). The specific numerals assigned to the elements are provided solely to aid in the description and are not meant to imply any limitations (structural, functional, or otherwise) on the described embodiment. It will be appreciated that for simplicity and clarity of illustration, elements illustrated in the figures have not necessarily been drawn to scale. For example, the dimensions of some of the elements are exaggerated relative to other elements.

It is understood that the use of specific component, device and/or parameter names, such as those of the executing utility, logic, and/or firmware described herein, are for example only and not meant to imply any limitations on the described embodiments. The embodiments may thus be described with different nomenclature and/or terminology utilized to describe the components, devices, parameters, methods and/or functions herein, without limitation. References to any specific protocol or proprietary name in describing one or more elements, features or concepts of the embodiments are provided solely as examples of one implementation, and such references do not limit the extension of the claimed embodiments to embodiments in which different element, feature, protocol, or concept names are utilized. Thus, each term utilized herein is to be given its broadest interpretation given the context in which that term is utilized.

As further described below, implementation of the functional features of the disclosure described herein is provided within processing devices and/or structures and can involve use of a combination of hardware, firmware, as well as several software-level constructs (e.g., program code and/or program instructions and/or pseudo-code) that execute to provide a specific utility for the device or a specific functional logic. The presented figures illustrate both hardware components and software and/or logic components.

Those of ordinary skill in the art will appreciate that the hardware components and basic configurations depicted in the figures may vary. The illustrative components are not intended to be exhaustive, but rather are representative to highlight essential components that are utilized to implement aspects of the described embodiments. For example, other devices/components may be used in addition to or in place of the hardware and/or firmware depicted. The depicted example is not meant to imply architectural or other limitations with respect to the presently described embodiments and/or the general invention. The description of the illustrative embodiments can be read in conjunction with the accompanying figures. Embodiments incorporating teachings of the present disclosure are shown and described with respect to the figures presented herein.

FIG. 1 presents a simplified functional block diagram of an electronic device in which the features of the present disclosure are advantageously implemented for accurately reconstructing descriptive information that was not captured in the image due to an obstruction or which is unreadable due to being skewed, marked over, or erased from the captured version of the image. The obstruction wholly or partially obscures descriptive information. In an example, the obstruction is an object, described below with regard to FIGS. 4 and 8. In another example, the obstruction is due to a three-dimensional shape of an object captured in the image and that presents descriptive information, described below with regard to FIG. 8. In an additional example, the obstruction is due to surface marring (e.g., erasure, staining, and marking) of a two-dimensional or three-dimensional object captured in an image and that presents descriptive information, described below with regard to FIG. 8. In one or more embodiments, the electronic device includes additional communications functionality that enables electronic device to be referred to as communication device 100, which operates as a mobile user device for user 101 in communication environment 102.

Communication device 100 can be one of a host of different types of devices, including but not limited to, a mobile cellular phone, satellite phone, or smart phone, a laptop, a netbook, an ultra-book, a networked smartwatch, or networked sports/exercise watch, and/or a tablet computing device or similar device that can include wireless communication functionality. As a device supporting wireless communication, communication device 100 can be utilized as, and also be referred to as, a system, device, subscriber unit, subscriber station, mobile station (MS), mobile, mobile device, remote station, remote terminal, user terminal, terminal, user agent, user device, a session initiation protocol (SIP) phone, a wireless local loop (WLL) station, a personal digital assistant (PDA), computer workstation, a handheld device having wireless connection capability, a computing device, or other processing devices. User 101 may use one or more second electronic devices similar or identical to communication device 100 with preferences shared across devices.

Aspects of the present disclosure may be implemented at least in part in obstructed image reconstruction (OIR) server (s) 103 that includes some or all of the components and functionality described herein. In an example, to reduce power consumption and processing capacity requirements, communication device 100 may distribute processing tasks for obstructed image reconstruction to OIR server(s) 103. In the specific example of FIG. 1, communication environment 102 may further include transaction repositories 104, security access transaction portals 105 having password databases 106, and second party web server(s) 107, which are accessible to communication device 100 through communication network 108. Second parties may be goods and services providers such as manufacturers, retail or wholesale vendors, and distributors, peer-to-peer resellers, consignment or marketplace portal providers, etc. Communication device 100 includes communications subsystem 109 that connects via wired or wireless channel 110 to node 111 (e.g., wireless access point, cellular tower) to communicatively connect to OIR server(s) 103, security access transaction portals 105, and second party web server(s) 107 via one or more communication network 108.

In addition to communications subsystem 109, communication device 100 may include controller 120, memory 122, data storage subsystem 124 and input/output (I/O) subsystem 126. To enable management by controller 120, system interlink 128 communicatively connects controller 120 with communications subsystem 109, memory 122, data storage subsystem 124 and I/O subsystem 126. System interlink 128 represents internal components that facilitate internal communication by way of one or more shared or dedicated internal communication links, such as internal serial or parallel buses. As utilized herein, the term "communicatively coupled" means that information signals are transmissible through various interconnections, including wired and/or wireless links, between the components. The interconnections between the components can be direct interconnections that include conductive transmission media or may be indirect interconnections that include one or more intermediate electrical components. Although certain direct interconnections (i.e., system interlink 128) are illustrated in FIG. 1, it is to be understood that more, fewer, or different interconnections may be present in other embodiments.

Controller 120 includes processor 130, which includes one or more central processing units (CPUs) or data processors. Processor 130 can include one or more digital signal processors and graphics processing units (GPUs), etc. that can be integrated with data processor(s). Processor 130 can include other processors such as auxiliary processor(s) that may act as a low power consumption, always-on sensor hub for physical sensors. Controller 120 manages, and in some instances directly controls, the various functions and/or operations of communication device 100. These functions and/or operations include, but are not limited to including, application data processing, communication, navigation tasks, image processing, and signal processing. In one or more alternate embodiments, communication device 100 may use hardware component equivalents for application data processing and signal processing. For example, communication device 100 may use special purpose hardware, dedicated processors, general purpose computers, microprocessor-based computers, micro-controllers, optical computers, analog computers, dedicated processors and/or dedicated hard-wired logic.

Memory 122 stores program code 132 for execution by processor 130 to provide the functionality described herein. Program code 132 includes applications such as communication application 133 for communicating with second electronic device(s), image capturing module 134 for capturing images that may be obscured, and OIR module 135, and other applications 136. OIR module 135 may include artificial intelligence (AI) model 137. Additional functionality and features of OIR module 135 are described below with regard to FIG. 3.

In one or more embodiments, several of the described aspects of the present disclosure are provided via executable program code of applications executed by controller 120. In one or more embodiments, program code 132 may be integrated into a distinct chipset or hardware module as firmware that operates separately from executable program code. Portions of program code 132 may be incorporated into different hardware components that operate in a distributed or collaborative manner. Memory 122 further includes operating system (OS), firmware interface, such as basic input/output system (BIOS) or Uniform Extensible Firmware Interface (UEFI), and firmware, which also includes and may thus be considered as program code 132.

Program code 132 may access, use, generate, modify, store, or communicate computer data 140, such as login credentials 141, communication records 142, and transaction format data 143, and other computer data 144 for OIR module 135 to use in reconstructed obstructed images. Location module 145 may provide a location of communication device 100 for adding to metadata of images captured by communication device 100. Computer data 140 may incorporate "data" that originated as raw, real-world "analog" information that consists of basic facts and figures. Computer data 140 includes different forms of data, such as numerical data, images, coding, notes, and financial data. Computer data 140 may originate at communication device 100 or be retrieved from a remote device via communications subsystem 109. Communication device 100 may store, modify, present, or transmit computer data 140. Computer data 140 may be organized in one of a number of different data structures. Common examples of computer data 140 include video, graphics, text, and images. Computer data 140 can also be in other forms of flat files, databases, and other data structures.

Data storage subsystem 124 of communication device 100 includes data storage device(s) 148. Controller 120 is communicatively connected, via system interlink 128, to data storage device(s) 148. Data storage subsystem 124 provides program code 132 and computer data 140 stored on non-volatile storage that is accessible by controller 120. For example, data storage subsystem 124 can provide a selection of program code 132 and computer data 140. These applications can be loaded into memory 122 for execution/processing by controller 120. In one or more embodiments, data storage device(s) 148 can include hard disk drives (HDDs), optical disk drives, and/or solid-state drives (SSDs), etc. Data storage subsystem 124 of communication device 100 can include removable storage device(s) (RSD(s)) 150, which is received in RSD interface 152. Controller 120 is communicatively connected to RSD 150, via system interlink 128 and RSD interface 152. In one or more embodiments, RSD 150 is a non-transitory computer program product or computer readable storage device that stores program code and/or instructions that may be executed by a processor associated with a user device such as communication device 100. Controller 120 can access data storage device(s) 148 or RSD 150 to provision communication device 100 with program code 132 and computer data 140.

I/O subsystem 126 may include internal input devices 154 such as image capturing device(s) 155, microphone 156, and touch input devices 158 (e.g., screens, keys, or buttons). I/O subsystem 126 may include physical buttons/actuators 159 that can be located on a periphery of the device housing. I/O subsystem 126 may include internal output devices 162 such as display(s) 164, lights 166, audio output devices 168, and vibratory or haptic output devices 170.

In one or more embodiments, OIR module 135 includes AI model 137 that is trained to recognize objects such as obstruction and to recognize descriptive information such as text and symbols. OIR module 135 and AI model 137 may be stored in memory 122 of communication device 100 and be executed by controller 120 to perform various aspects of the functionality of the present disclosure. Training of AI model 137 is the process by which AI models are trained to perform specific tasks or achieve certain objectives. The training involves providing the model with a large amount of data and allowing the model to learn from patterns and relationships within that data. Controller 120 may include various functionalities that enable controller 120 to perform different aspects of AI models. AI models may include an artificial neural network, a decision tree, a support vector machine, Hidden Markov model, linear regression, logistic regression, Bayesian networks, and so forth. The AI models can be individually trained to perform specific tasks and can be arranged in different sets of AI models to generate different types of output.

Figure 2:
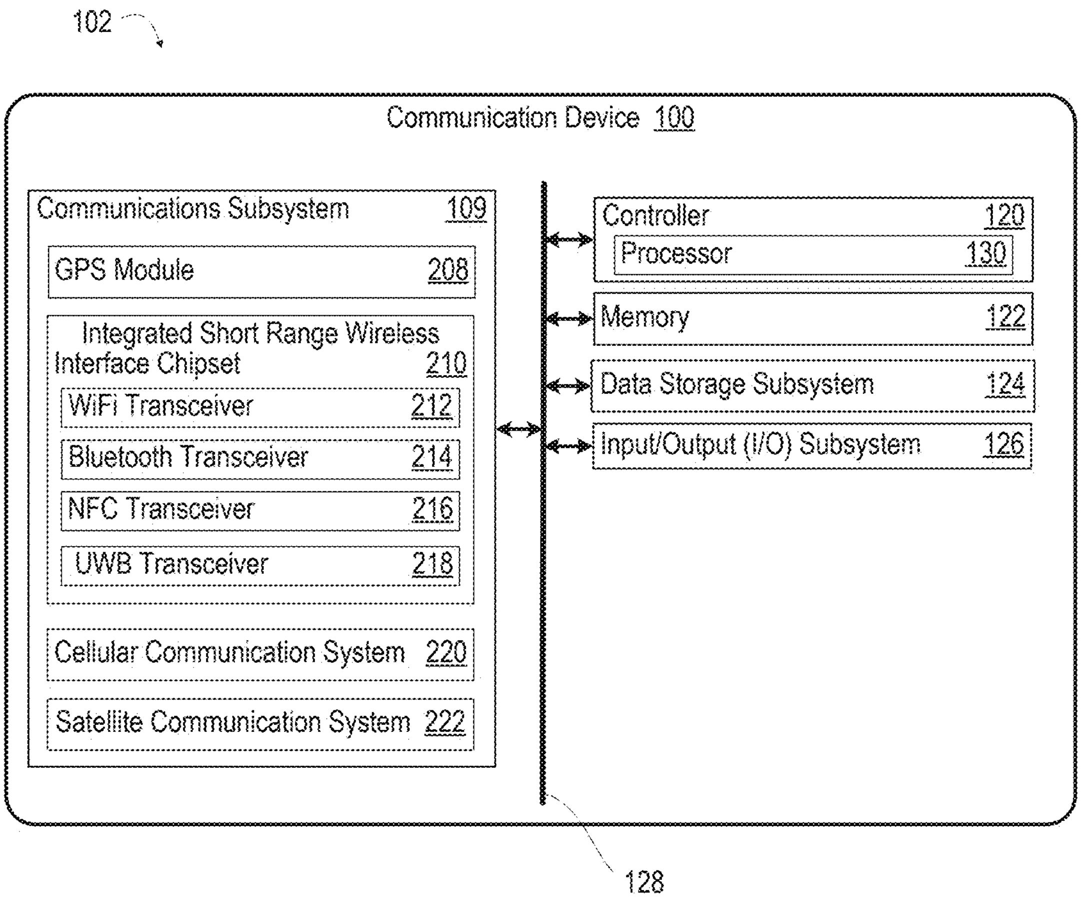
FIG. 2 is a simplified block diagram of the communication device having additional communication interfaces for wireless communications, according to one or more embodiments.

FIG. 2 is a simplified block diagram of communication device 100 having additional communication interfaces for wireless communications. In one or more embodiments, controller 120, via communications subsystem 109, performs multiple types of cellular over-the-air (OTA) or wireless communication, such as by using a Bluetooth connection or other personal access network (PAN) connection. In an example, a user may wear a health monitoring device such as a smartwatch that is communicatively coupled via a wireless connection. In one or more embodiments, communications subsystem 109 includes a global positioning system (GPS) module 208 that receives GPS broadcasts from GPS satellites to obtain geospatial location information. In one or more embodiments, controller 120, via communications subsystem 109, communicates via a wireless local area network (WLAN) link using one or more IEEE 802.11 WLAN protocols with an access point. In one or more embodiments, controller 120, via communications subsystem 109, may communicate via an OTA cellular connection with radio access networks (RANs). In an example, communication device 100, via communications subsystem 109, connects via RANs of a terrestrial network that is communicatively connected to a network server. In one or more embodiments, communications subsystem 109 includes integrated short range wireless interface chipset 210 having one or more of Wi-Fi component 212, Bluetooth (BT) transceiver (TxRx) 214, near field communication (NFC) transceiver 216, and ultra-wideband transceiver 218. In one or more embodiments, communications subsystem 109 further includes long distance communication capabilities including cellular communication system 220 and satellite communication system 222.

With particular reference to FIG. 1, according to aspects of the present disclosure, an electronic device such as communication device 100 includes memory 122 that stores at least one communication application 133 and OIR module 135. Communication device 100 includes communications subsystem 109 connectable to communication network 108. Processor 130 of communication device 100 is communicatively coupled to communications subsystem 109 and memory 122. In response to a trigger to reconstruct a first image of a physical transaction record having content that is partially obstructed, processor 130 is configured to cause communication device 100 to identify in the first image an obstruction at least partially obfuscating a section of the first image. Processor 130 is configured to cause communication device 100 to identify at least one first portion of descriptive information on another section of the first image that is unobstructed, the descriptive information comprising identifying indications of a transaction second party and at least one transaction identifying aspect. Processor 130 is configured to cause communication device 100 to identify a first format of an example physical transaction record, at least in part based on matching a partial format of the descriptive information to an example format of the example physical transaction record. Processor 130 is configured to cause communication device 100 to identify, based on the first format, at least one category of transaction information of the descriptive information obscured in the section of the first image. Processor 130 is configured to cause communication device 100 to retrieve, via the communications subsystem from a network source (e.g., transaction repositories 104, security access transaction portals 105, and second party web server(s) 107), information corresponding to, or enabling determination of, the at least one category of the descriptive information obscured from the first image due to the obstruction. The network source may be identified based on a business name, a business address, a business telephone number, a business email address, or a business logo that is/are at least partially visible in the first image. Processor 130 is configured to cause communication device 100 to delineate the first image into multiple segments comprising at least one first segment encompassing the section with the obstruction, and which separates the obstruction from at least one second segment encompassing a visible portion of the other section of the first image that is unobstructed. Processor 130 is configured to cause communication device 100 to reconstruct an unobstructed first image by inpainting, in the at least one first segment of the first image, at least one second portion of descriptive information that was hidden by the obstruction in the first image, the at least one second portion of descriptive information determined based on the information retrieved from the network source.

In one or more embodiments, processor 130 is further configured to cause communication device 100 to identify, in part based on the first format, one of a label category and an associated value category as the at least one category of transaction information of the descriptive information at least partially unobscured in the other section of the first image. Processor 130 is configured to cause communication device 100 to retrieve, via the communications subsystem from the network source, the other one of the label category and the associated category value of the descriptive information that is at least partially obscured from the first image due to the obstruction.

In one or more embodiments, communication device 100 includes image capturing device(s) 155 that is communicatively coupled to processor 130. Processor 130 is further configured to cause communication device 100 to photographically capture the first image using image capturing device 155, in response to an activation trigger. Processor 130 is further configured to cause communication device 100 to determine, via AI module 137 scanning the captured first image, that at least one portion of alphanumeric information is obscured by an object in front of the at least one portion of the capture first image. Processor 130 is further configured to cause communication device 100 to generate a prompt with selectable option to trigger activation of the reconstruction of the first image.

In one or more embodiments, in response to determining that the descriptive information in the section of the first image identifies user 101 of communication device 100 as a transaction first party to an online transaction portal (e.g., security access transaction portals 105 having password databases 106), processor 130 is further configured to cause communication device 100 to obtain login credentials 141 associated with user 101 of communication device 100 corresponding to the transaction portal. Processor 130 is further configured to cause communication device 100 to access the network source (e.g., security access transaction portals 105) using login credentials 141. Processor 130 is further configured to cause communication device 100 to retrieve the transaction information corresponding to the descriptive information that is obscured.

In one or more particular embodiments, in retrieving the information from at least one category of transaction information, processor 130 is further configured to cause communication device 100 to extract information for one or more categories from among a group that includes, but is not necessarily limited to: (i) a name; (ii) a website; (iii) an email address; (iii) a logo; (iv) a transaction identifier; (v) a transaction date; (vi) at least one transacted item; (vii) a corresponding transactional price associated with each of the at least one transacted item; (viii) taxes for the first transaction; (ix) a tax rate for the at least one transacted item; (x) a shipping/delivery/processing cost for the first transaction; and (xi) mathematical combination of the transactional price and accompanying costs for the at least one transacted item.

In one or more particular embodiments, processor 130 is further configured to cause communication device 100 to determine a location of the first transaction based on one or more detail within the descriptive information. Processor 130 is further configured to cause communication device 100 to determine, based on the location, a corresponding locality tax rate associated with a location of the first transaction. Processor 130 is further configured to cause communication device 100 to determine the taxes applicable for the first transaction by calculating a local tax using a transaction total and the locality tax rate. Processor 130 is further configured to cause communication device 100 to inpaint at least one of the local tax and a calculated total cost with applied tax that is obscured in the first image.

In one or more particular embodiments, processor 130 is further configured to cause communication device 100 to determine one or more of position, scale, skew, and orientation characteristic of the descriptive information in first image. In one or more particular embodiments, processor 130 is further configured to cause communication device 100 to alter corresponding one or more of position, scale, skew, and orientation of the retrieved descriptive information obscured from the first the image to generate an altered version of the retrieved descriptive information having a format that matches a corresponding characteristic of the first image. Processor 130 is further configured to cause communication device 100 to inpaint the at least one first segment using the altered version of the retrieved descriptive information.

Figure 3:
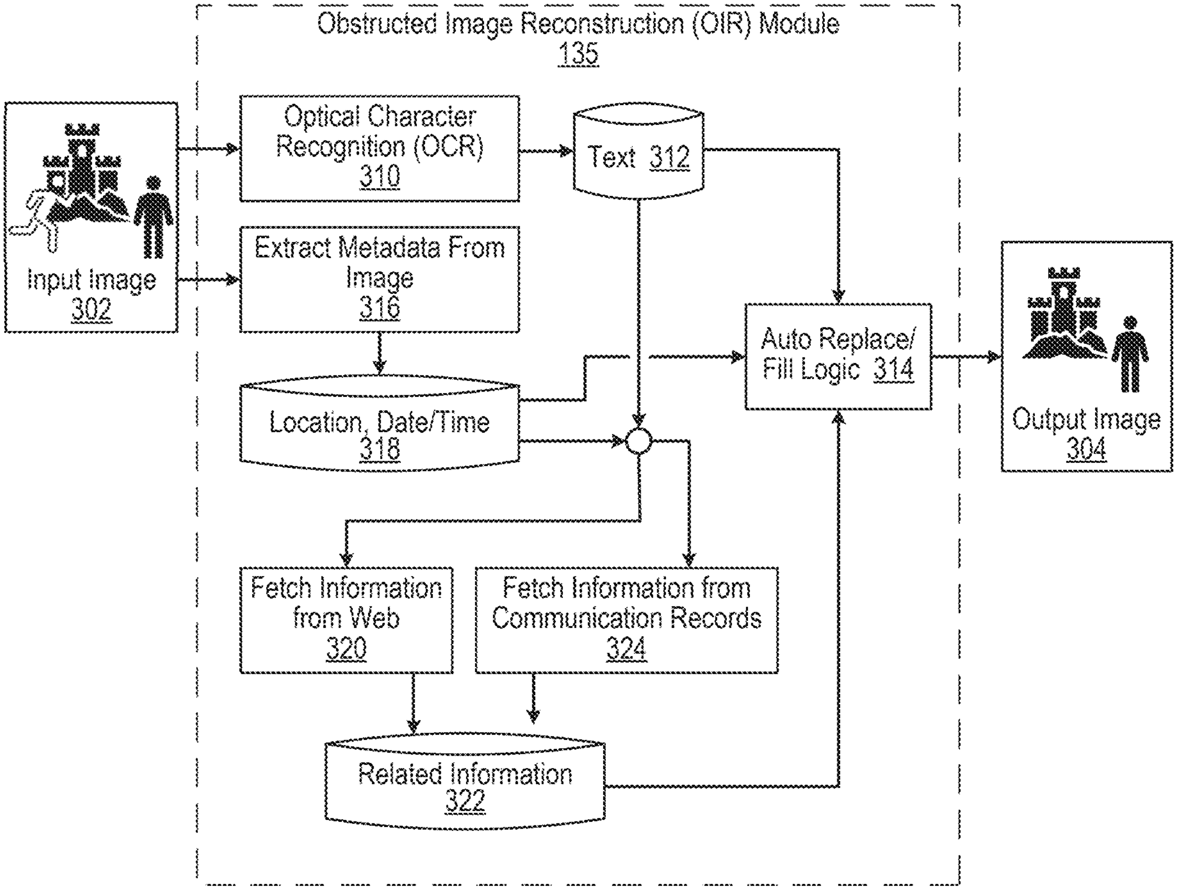
FIG. 3 is processing flow diagram for obstructed image reconstruction of an input image to an output image, according to one or more embodiments.

FIG. 3 is processing flow diagram for obstructed or obscured image reconstruction by processor execution of OIR module 135 to generate, from input image 302 having obstructed/obscured sections, output image 304 that is a reconstructed, unobstructed and/or unobscured image. In block 310, optical character recognition (OCR) is performed on input image 302, resulting in text data 312 that is provided to block 314 for auto replace/fill logic. In one or more embodiment, replace and fill processing may be performed by delineation and inpainting. In block 316, extraction of metadata from input image 302 is performed to obtain metadata such as location, date/time data 318 that is provided to block 314. In one or more embodiments, text data 312 and location, date/time data 318 are provided to block 320 to provide or enable determination of source location information that can be used for fetching image filling information from the web, resulting in capturing related information 322 that can be used to replace and fill descriptive information that had been previously obstructed or obscured. In one or more embodiments, text data 312 and location, date/time data 318 are provided to block 324 for fetching additional related information 322 from one or more communication record (e.g., short message service (SMS) text, emails, electronic file transfer (EFT) documents).

Figure 4:
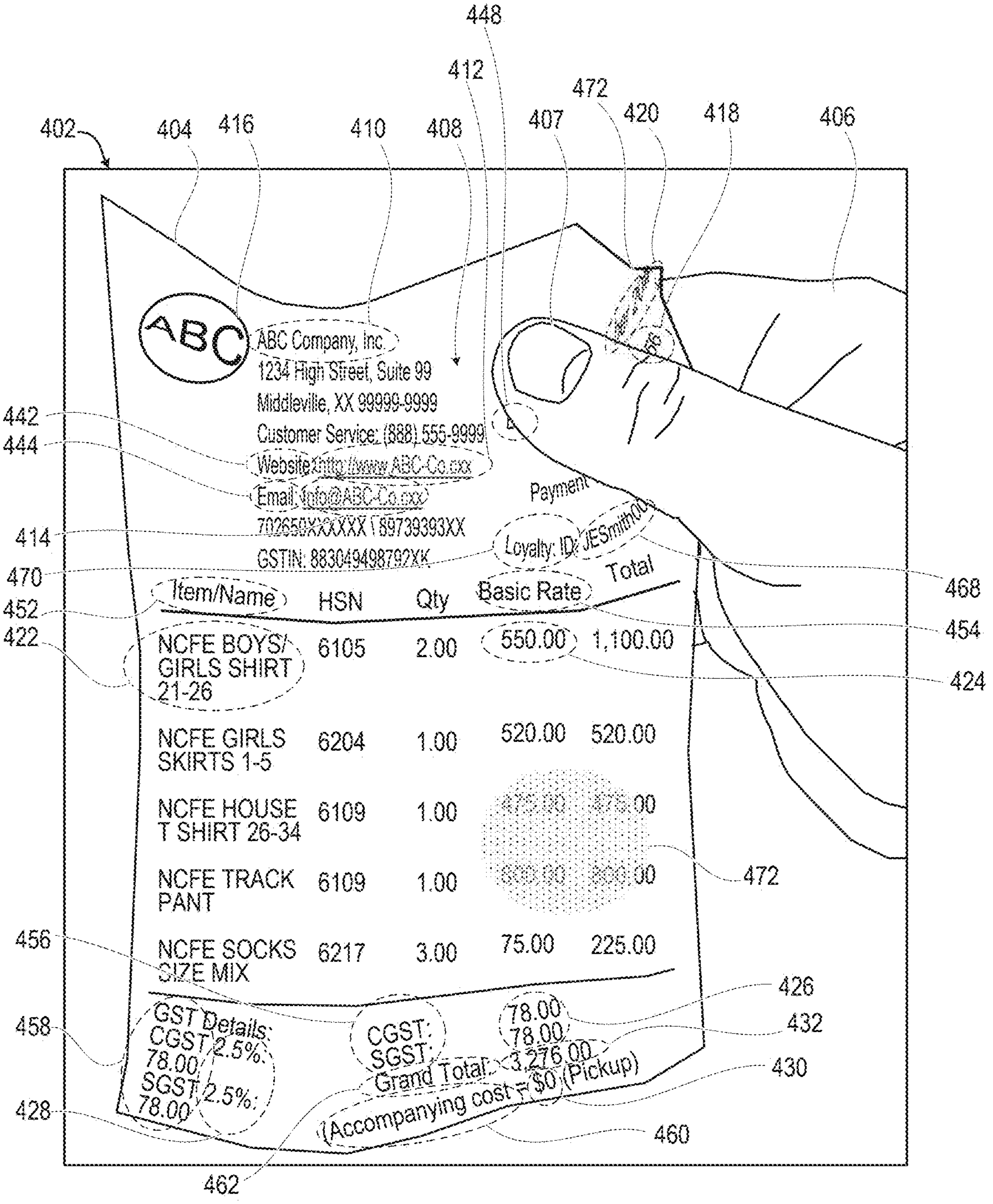
FIG. 4 is an obstructed image of a physical transaction record being held at one corner by a hand that obstructs a portion of descriptive information, according to one or more embodiments.

FIG. 4 presents a partially obstructed/obscured image 402 of physical transaction record 404 being held at one corner by hand 406 that provides obstruction 407 to a portion of physical transaction record 404. Physical transaction record 404 is nonplanar, presenting descriptive information 408 with different orientations and skew. In an example, descriptive information 408 includes categories of information including: (i) name 410; (ii) website 412; (iii) email address 414; (iii) logo 416; (iv) transaction identifier 418 (partially visible) for a first transaction; (v) transaction date 420 (partially visible); (vi) at least one transacted item 422; (vii) corresponding transactional price 424 associated with each of at least one transacted item 422; (viii) taxes 426 for the first transaction; (ix) tax rate 428 for at least one transacted item 422; (x) shipping/delivery/processing cost 430 for the first transaction; and (xi) mathematical combination 432 of the transactional price and accompanying costs for at least one transacted item 422. Each category of descriptive information may be accompanied with a category label such as website label 442, email address 444, transaction identifier label 448 (partially obstructed), (v) transaction date label 450 (obstructed, see FIG. 5), transacted item label 452, corresponding transactional price label 454, taxes label 456, tax rate label 458, shipping/delivery/processing cost label 460 (i.e., accompanying costs), and mathematical combination label 462. In one or more embodiments, user loyalty identifier 468 (partially visible) and user loyalty label 470 may indicate that transaction records are accessible at transaction repositories 104 (FIG. 1).

Physical transaction record 404 may have a at least a portion that is non-perpendicularly positioned with respect to an image capturing device, affecting a skew or scale of descriptive information. Physical transaction record 404 may be bent, curled, or crumbled to create portions that are nonplanar, affecting scale and skew of a portion of the unobstructed descriptive information. The distorted shape may affect reconstruction of obstructed descriptive information. In an example, upper right edge 472 is buckled such that transaction date 420 is skewed and scaled to an extent that render the descriptive information illegible. Physical transaction record 404 may also include an obstruction that results from surface marring (e.g., erasure or staining). In an example, second obstruction 474 is a stain that darkens a portion of physical transaction record 404 and reduces partially obstructs or obscures descriptive information.

Figure 5:
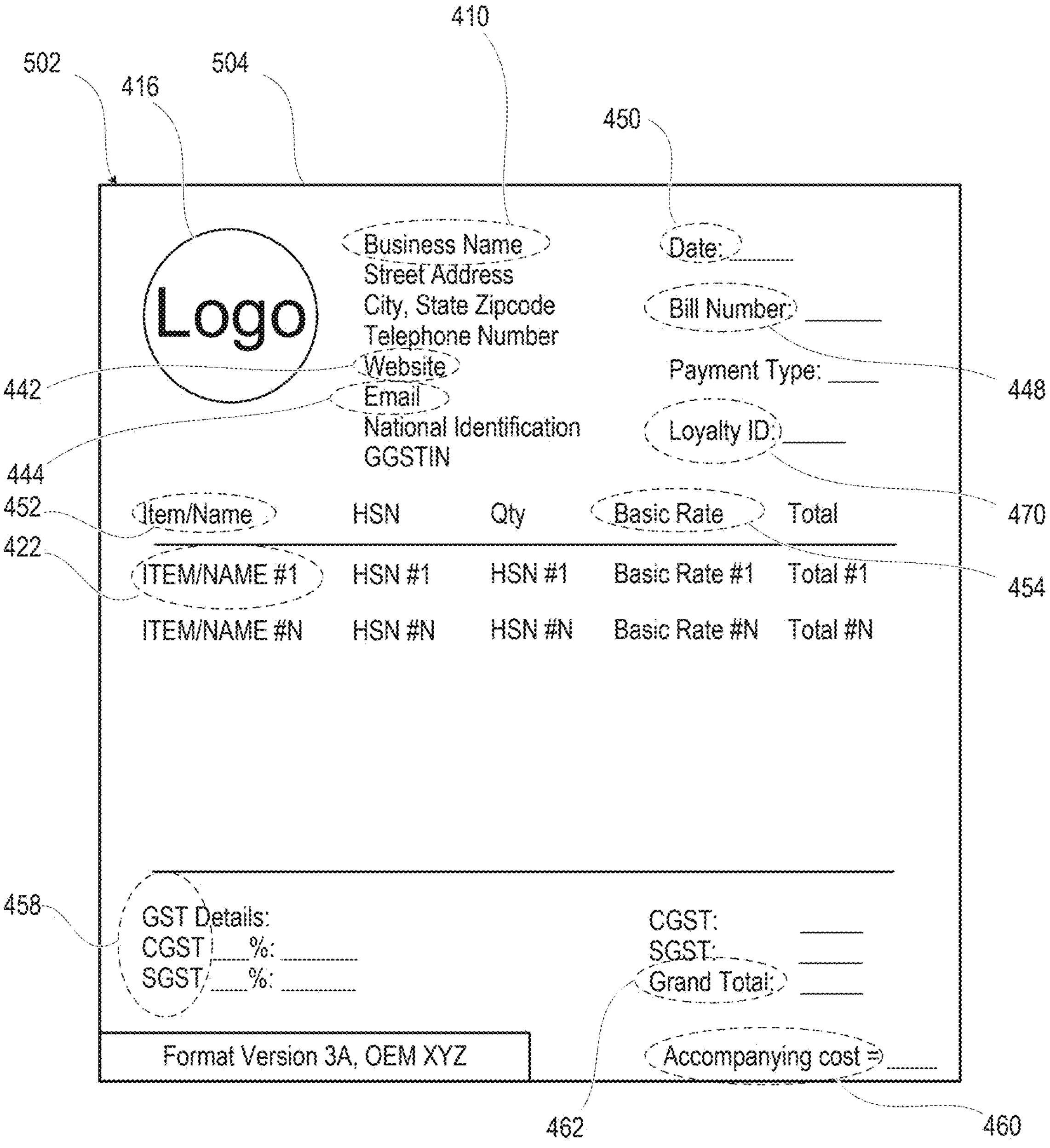
FIG. 5 is a format template associated with the physical transaction record of FIG. 4, according to one or more embodiments.

FIG. 5 is a format template 502 associated with hardcopy or physical transaction record 404 (FIG. 4) for a transaction. In an example, identifying the format template 502 may be known based on what point of sale equipment is being used by a second party or having an example physical transaction record from the same second party. Format template 502 provides orientation of values and labels. In an example, format template 502 corresponds to example physical transaction record 504, such as a rectangular shape and aspect ratio of format template 502. Example physical transaction record 504 has a two-dimensional shape.

Format template 502 may be stored at OIR server(s) 103 based on analyzing physical hardcopies of transaction records from one or more users from one or more second parties. Format template 502 may be received from published information from providers of original equipment manufacturers (OEMs) of printing equipment used by second parties to print transaction records. Format template 502 may be based on finding a previous physical transaction record between user 101 (FIG. 1) and the same second party. The previous physical transaction record may be captured in an image gallery, may be stored in a communication record (e.g., text or email), or may be stored at a network source (e.g., transaction repositories 104 or security access transaction portals 105). The OIR server(s) 103 may receive format template(s) 502 directly from second parties to facilitate the functionality of the present disclosure.

Figure 6:
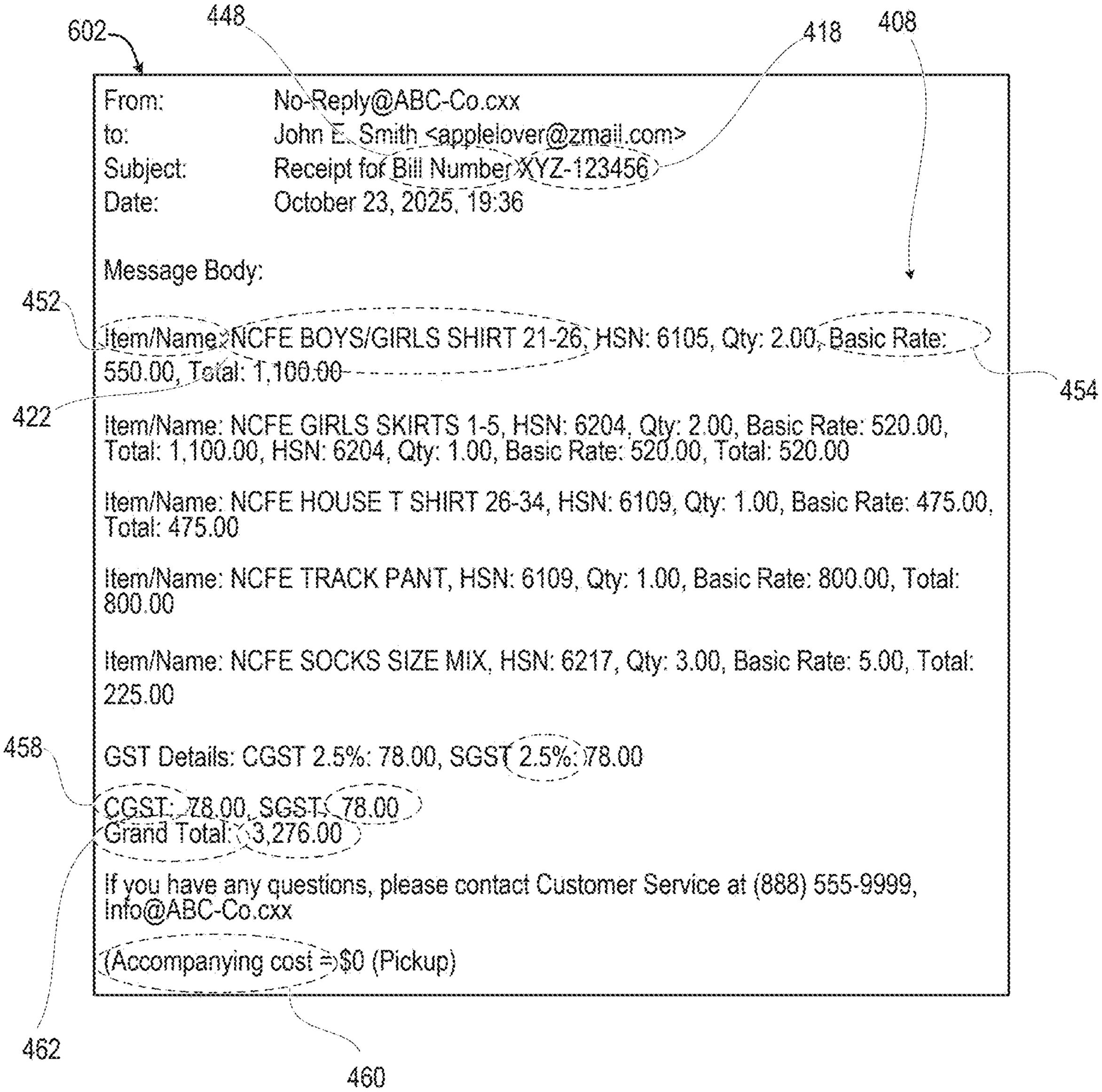
FIG. 6 is a transaction record associated with the transaction, containing at least some of the descriptive information that was obstructed/obscured in the obstructed image of FIG. 4, according to one or more embodiments.

FIG. 6 is transaction record 602 associated with the transaction and containing at least some of the descriptive information 408. The transaction record 602 may be a communication record, such as an email or text. The transaction record 602 may be web content, such as retrieved from transaction repositories 104 or a second-party web server(s) 107 (FIG. 1) or a second party web server(s) 107. In an example, the descriptive information 408 in transaction record 602 may not be formatted the same as physical transaction record 404 and format template 502. In an example, the second party uses one format appropriate for printing a transaction record and uses another format appropriate for emails describing the transaction. Printed receipts tend to be narrow, and emails are often in a document format that renders to a size appropriate for a display device.

Figure 7:
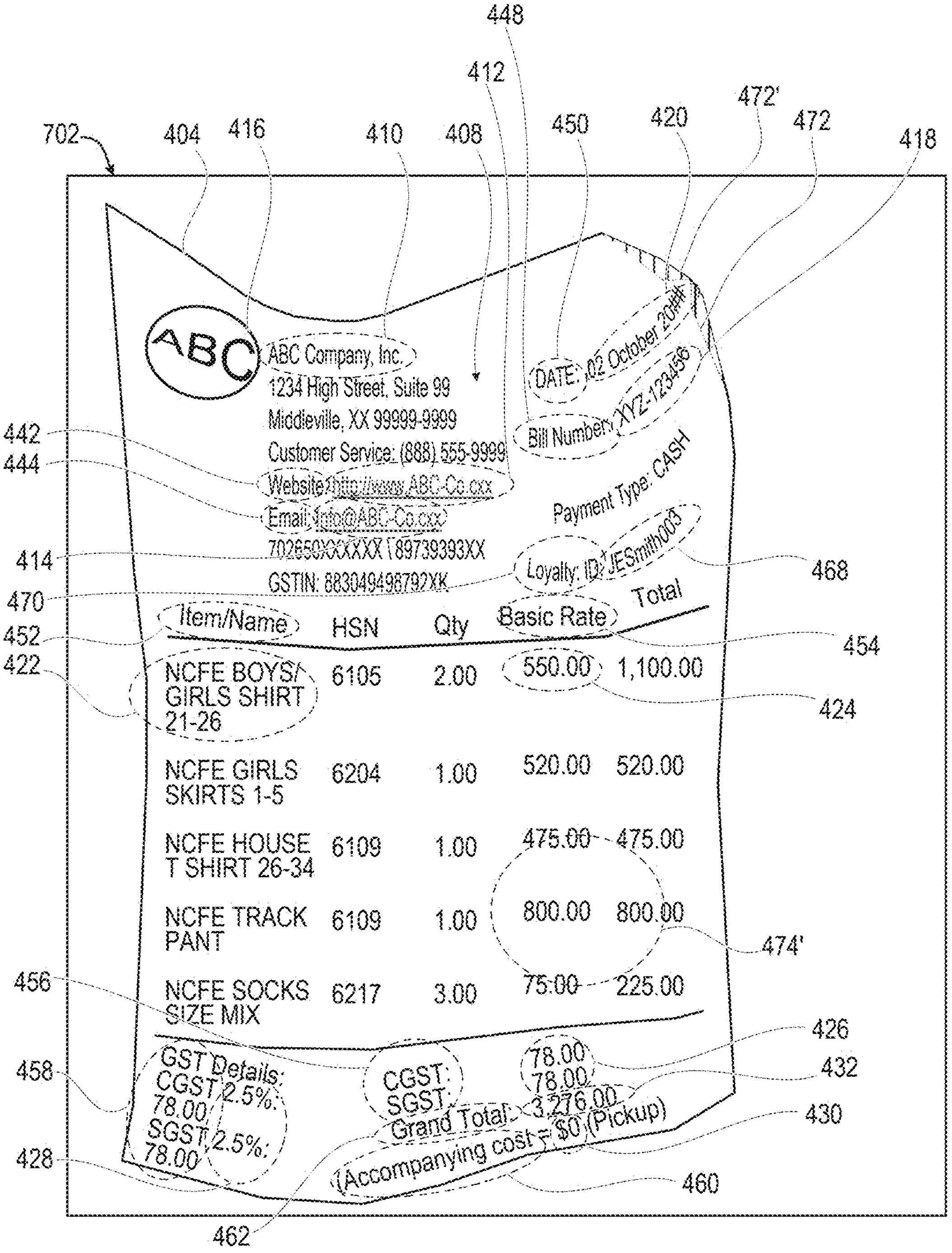
FIG. 7 is an example reconstructed image with descriptive information to realistically and accurately portray the physical transaction record without obstruction, according to one or more embodiments.

FIG. 7 illustrates reconstructed image 702 that realistically and accurately portrays physical transaction record 404 without obstruction. According to one or more embodiments, reconstructed image 702 is realistically and accurately generated with full descriptive information 408 based on merging and integrating details from partially obstructed/obscured image 402 (FIG. 4), format template 502 (FIG. 5), and transaction record 602 (FIG. 6). Unblocked portions of partially obstructed/obscured image 402 (FIG. 4) are retained in reconstructed image 702. Descriptive information that is obstructed in partially obstructed/obscured image 402 (FIG. 4) is identified using a combination of unblocked portions of partially obstructed/obscured image 402 (FIG. 4), format template 502 (FIG. 5), and transaction record 602 (FIG. 6). The descriptive information taken from transaction record 602 (FIG. 6) are realistically incorporated into reconstructed image 702, using size and location and other formatting aspects of unblocked portions of partially obstructed/obscured image 402 (FIG. 4) and format template 502 (FIG. 5). Descriptive information 408 is positioned, oriented, and scaled to match effects of physical transaction record 404 being nonplanar.

In one or more embodiments, reconstruction may include reducing or morphing three-dimensionality of physical transaction record 404 (FIG. 4) to improve legibility of descriptive information. In an example, upper right edge 472 (shown as a dashed line) of partially obstructed/obscured image 402 (FIG. 4) is altered outwardly to flattened upper right edge 472' of physical transaction record 404. To correspond to the flattened surface, transaction date 420' and transaction date label 450' have less skew and increased scale to render the descriptive information legible.

Thus, according to aspects of the present disclosure, in response to determining that one or more of position, scale, skew, and orientation of at least a portion of the descriptive information contained in the obstructed/obscured image 402 (FIG. 4) or reconstructed image 702 (FIG. 7) is not legible, processor 130 (FIG. 1) is configured to cause an electronic device such as communication device 100 to determine a three-dimensional shape of an object (e.g., physical transaction record 404 of FIG. 4) in the reconstructed image 702 (FIG. 7) upon which the at least the portion of the descriptive information is presented. Processor 130 (FIG. 1) is configured to cause communication device 100 to determine a two-dimensional shape of example physical transaction record 504 (FIG. 5). Processor 130 (FIG. 1) is configured to cause communication device 100 to morph the object (404) in the reconstructed image (702) toward the two-dimensional shape sufficient to enable altering the one or more of the position, the scale, the skew, and the orientation to render legible the at least the portion of the descriptive information.

In one or more embodiments, physical transaction record 404 may also include an obstruction that results from surfacing marring (e.g., erasure or staining). In an example, second obstruction 474 (FIG. 4) has also been removed as indicated by unstained circle 474' by eliminating matching a background coloration of surrounding portions of physical transaction record 404 (FIG. 4). Descriptive information within unstained circle 474' is either enhanced if partially obscured in physical transaction record 404 (FIG. 4) or reconstructed as provided above for descriptive information entirely obstructed by obstruction 407.

Thus, according to aspects of the present disclosure, processor 130 (FIG. 1) is configured to cause an electronic device such as communication device 100 to determine an object (e.g., second obstruction 474 of FIG. 4) in the obstructed/obscured image 402 (FIG. 4) upon which the descriptive information is presented. Second obstruction 474 of FIG. 4 is a surface marring of the object (e.g., physical transaction record 404). Processor 130 (FIG. 1) is configured to cause communication device 100 to reconstruct reconstructed image 702 without the surface marring.

Figure 8:
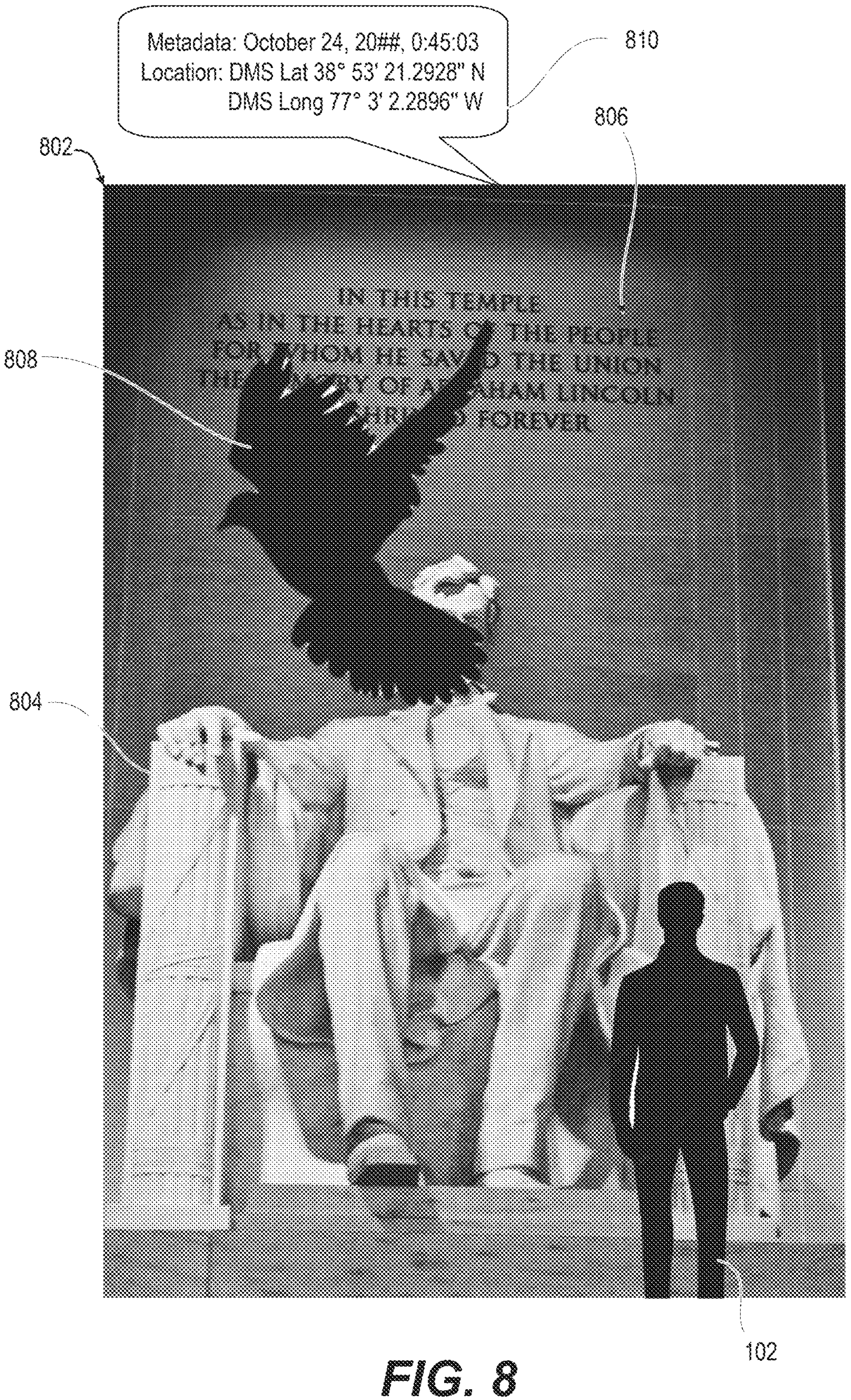
FIG. 8 is another obstructed image of a statue and inscription in a background with a user and an obstruction in a foreground, according to one or more embodiments.

FIG. 8 is first image 802 from a first vantage point of statue 804 and inscription 806 in a background with user 101 and obstruction 808 (i.e., a bird) in a foreground that partially obfuscates statue 804 and inscription 806. One or both of statue 804 and inscription 806 provide descriptive information that enables searching for a source from which the obfuscated descriptive information can be determined/retrieved. In an example, the remaining visual or graphical descriptive information of statue 804 is sufficient to enable image matching with an unobscured version of the captured image. In another example, textual descriptive information of inscription 806 provides enough words for word matching to a full version. The matching involves retrieving identifying details from the unobscured sections of the image and searching for and locating another copy of the image that is an unobscured version of the image.

In one or more embodiments, first image 802 includes metadata 810 that captures device and contextual information associated with image capture and post-capture processing. In an example, metadata 810 includes time/date and location information: "Metadata: October 24, 20##, 0:45:03, Location: Degree-Minute-Seconds (DMS) Latitude 38°53'21.2928" N, DMS Longitude 77°3'2.2896" W". Communication device 100 (FIG. 1) may use metadata such time/date and location to search for and retrieve descriptive information.

Figure 9:
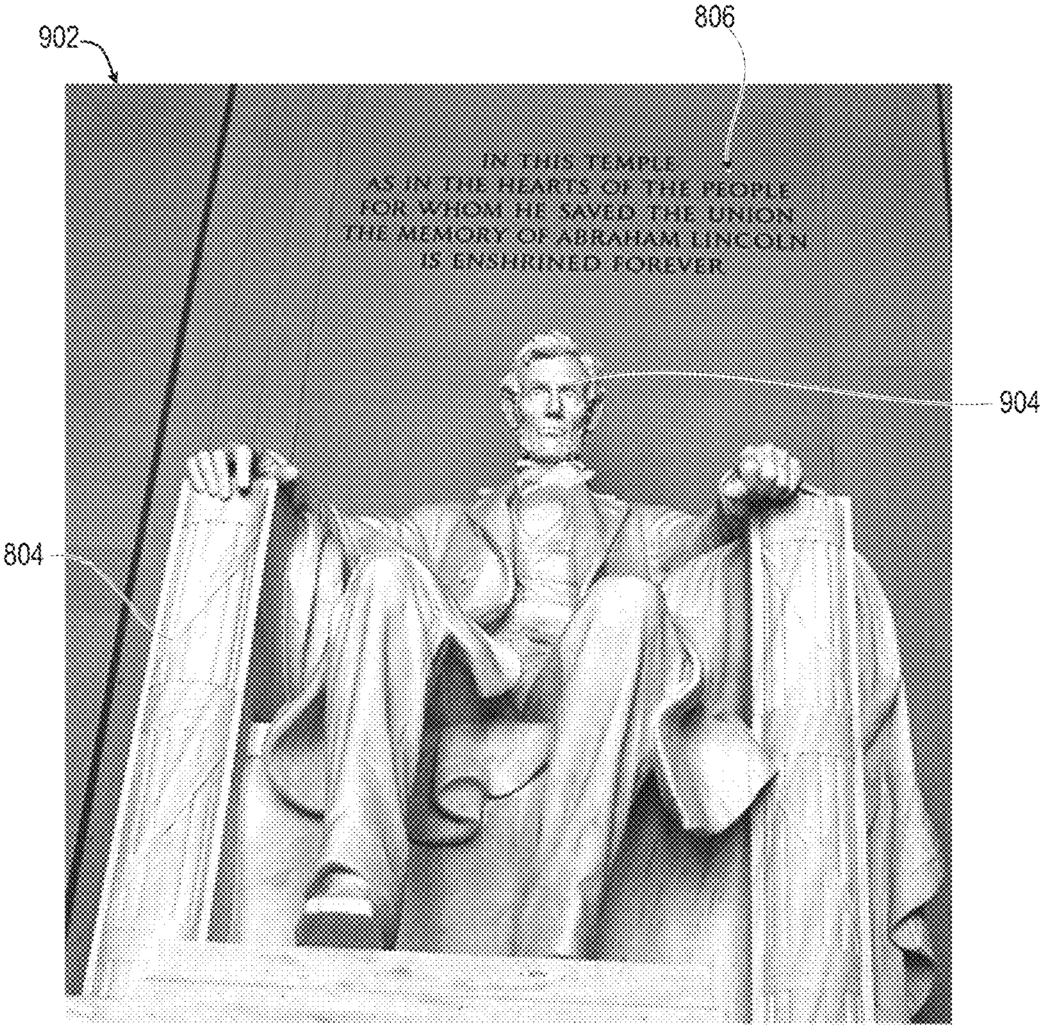
FIG. 9 is a second image of the statue and inscription that are unobstructed and from a second vantage point, according to one or more embodiments.

FIG. 9 presents second image 902 from a second vantage point of statue 804 with visual or graphical descriptive information of face 904 of statue 804 that is unobstructed. In addition, the following textual descriptive information of inscription 806 is also unobstructed. Second image 902 is also of a different size, color characteristics, cropping, and resolution as compared to first image 802 (FIG. 8). Although the second vantage point alters the orientation, size, skewing, and position of face 904 and inscription 806 in second image 902 as compared to first image 802 (FIG. 8) from the first vantage point, second image 902 provides descriptive information that is obfuscated in first image 802 (FIG. 8).

Figure 10:
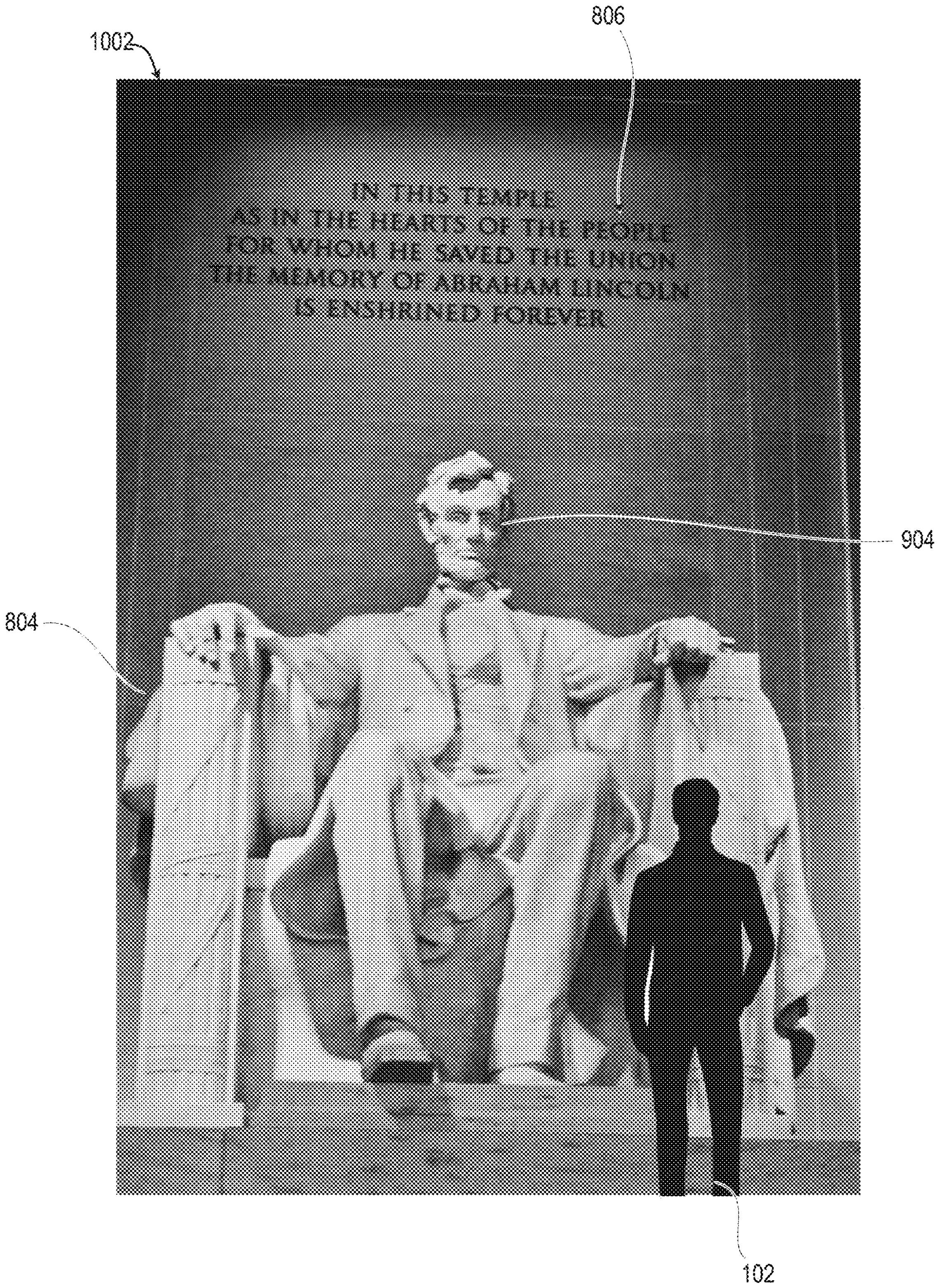
FIG. 10 is a reconstructed image of the obstructed/obscured image of FIG. 8 from the first vantage point of the statue and the inscription in the background with the user after replacing the obstruction with descriptive information retrieved from a network source, according to one or more embodiments.

FIG. 10 provides reconstructed image 1002 from the first vantage point of statue 804 and inscription 806 in the background that are both fully visible and not obfuscated, with user 101 in the foreground. Portions of inscription 806 and face 904 are retrieved from the second image 902 (FIG. 9) and inpainted in segments previously obfuscated by obstruction 808 (FIG. 8) after altering the presentation (e.g., color characteristics, size, skew, orientation, and position) to match other portions of descriptive information that is not obstructed or obscured in first image 802 (FIG. 8).

Figure 11A:
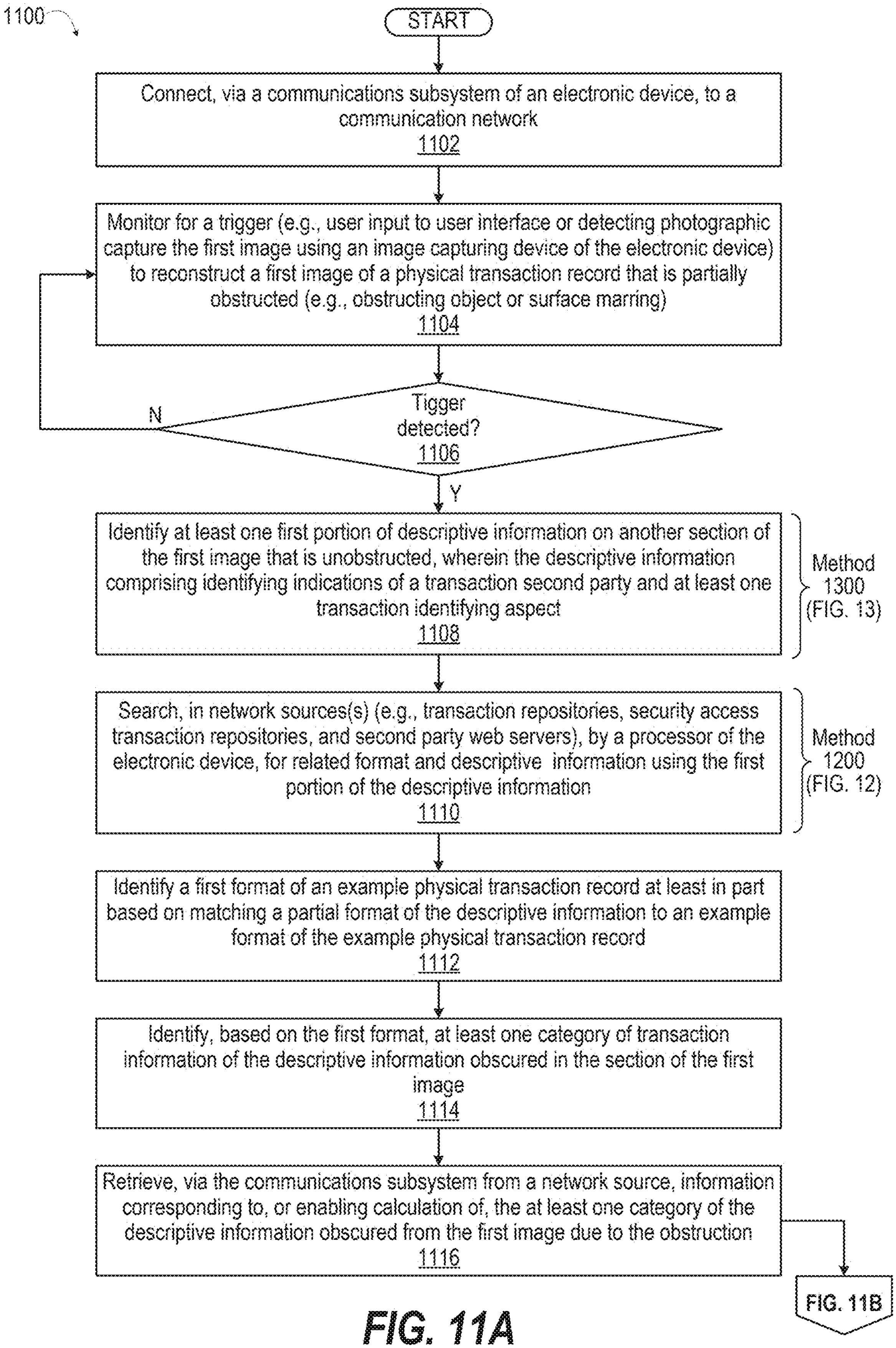
FIGS. 11A-11B (collectively "FIG. 11") are a flow diagram presenting a method for image editing by reconstructing descriptive information that was not captured in the image due to an obstruction, according to one or more embodiments.
Figure 11B:
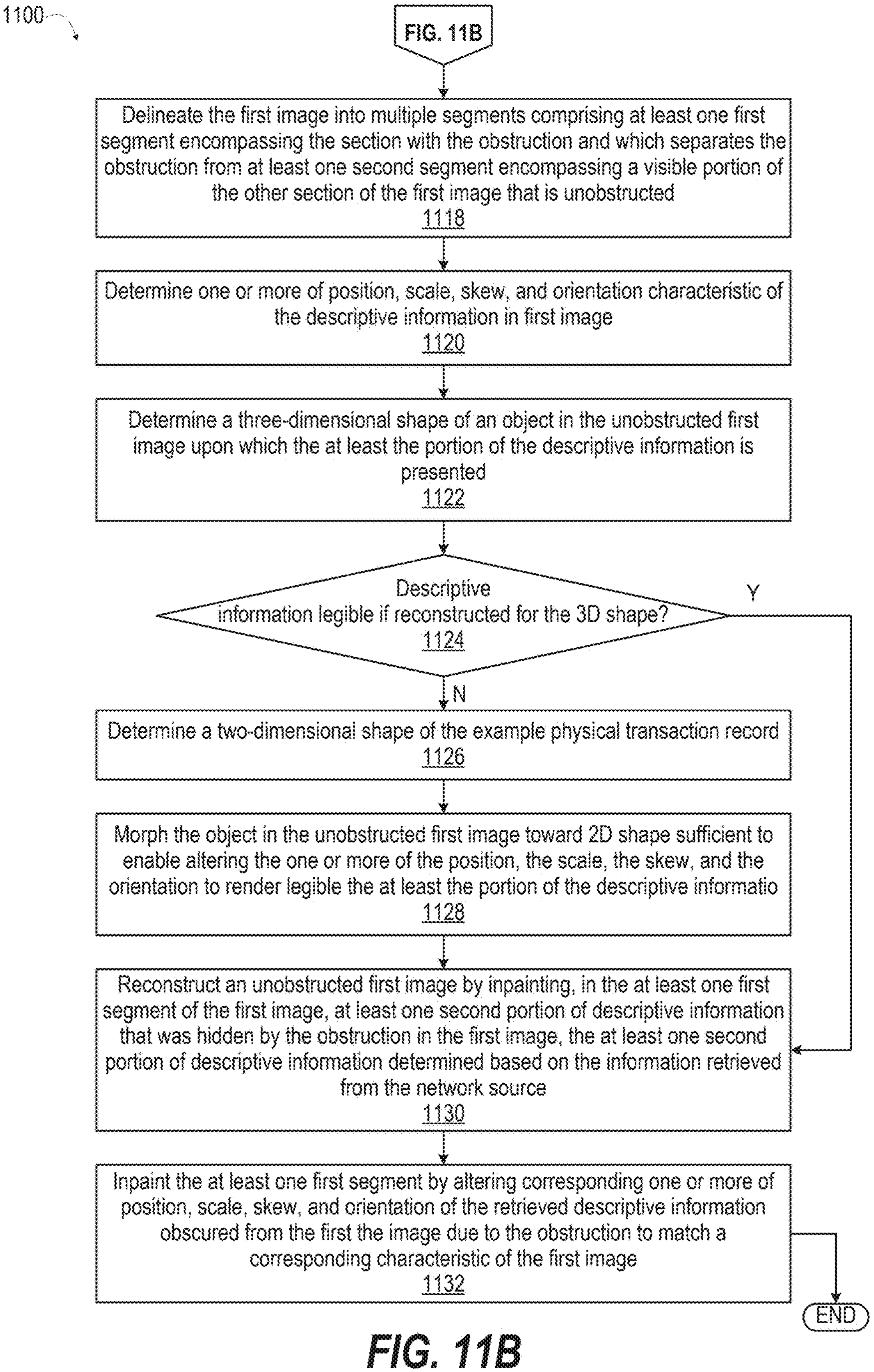
Figure 12:
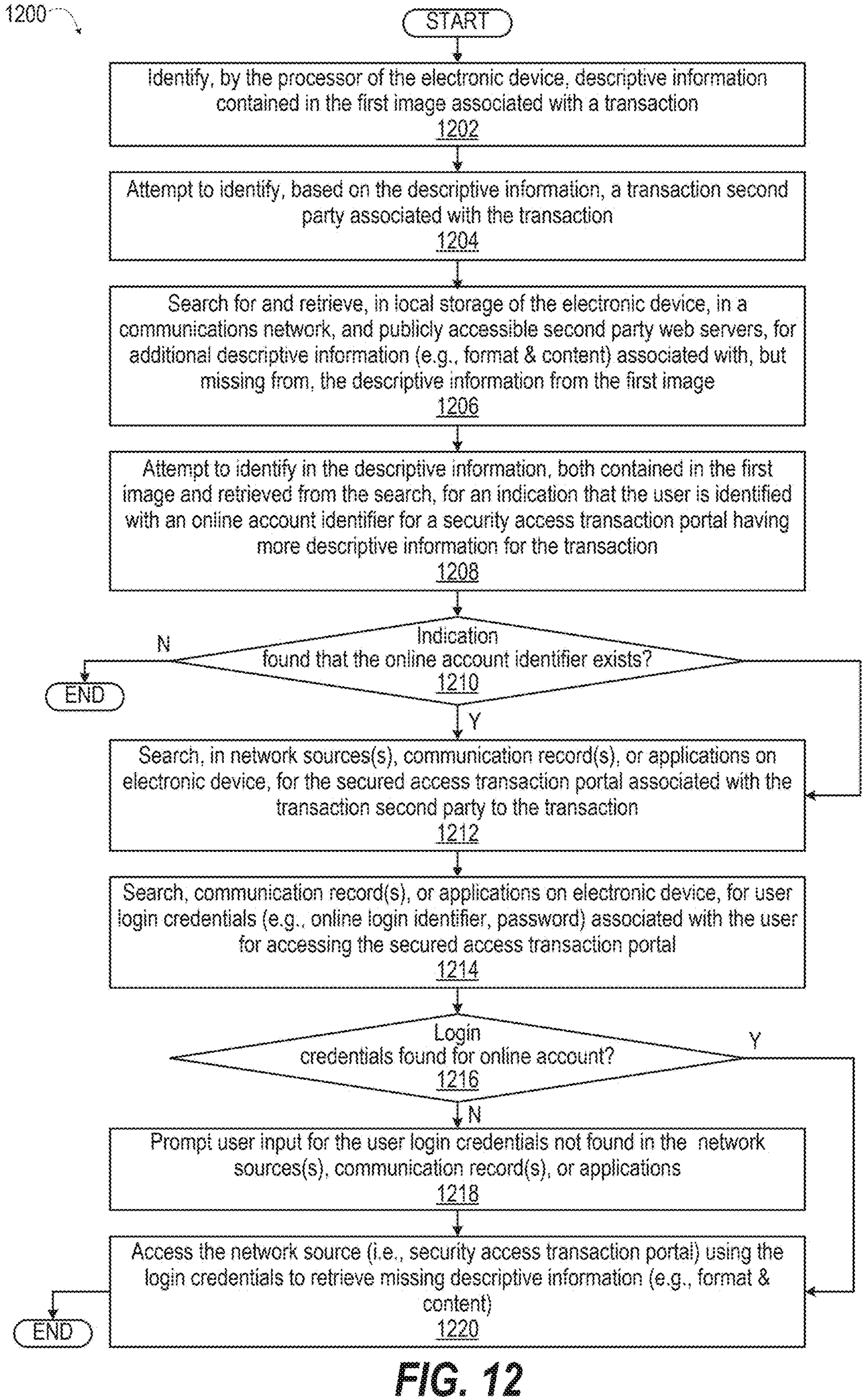
FIG. 12 is a flow diagram presenting a method for accessing descriptive information contained in an image, communication records, second party web servers, or security access web portals, according to one or more embodiments.
Figure 13A:
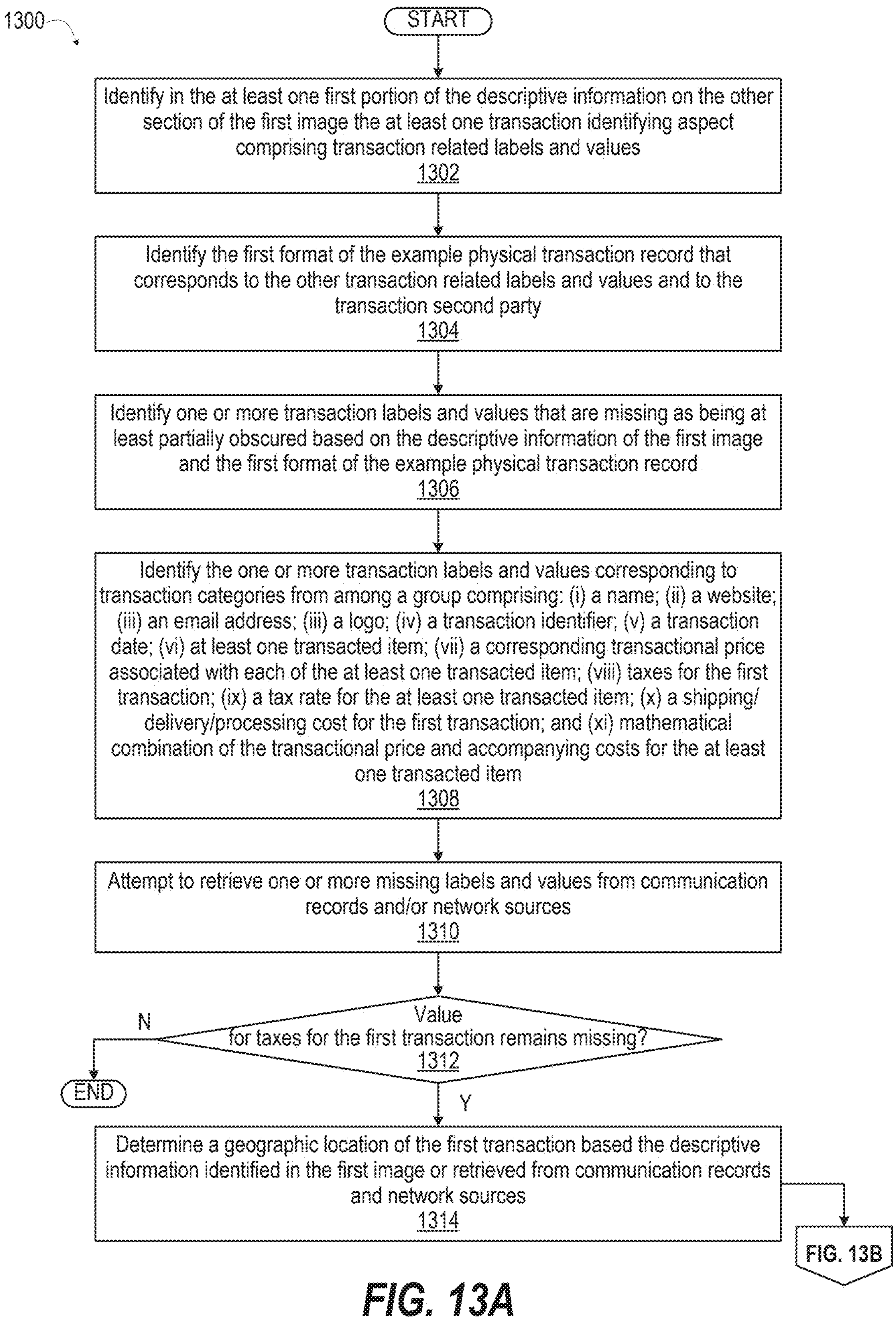
FIGS. 13A-13B (collectively "FIG. 13") are a flow diagram presenting a method for accessing and using the descriptive information of transaction information for reconstructing an image of a physical transaction record, according to one or more embodiments.
Figure 13B:
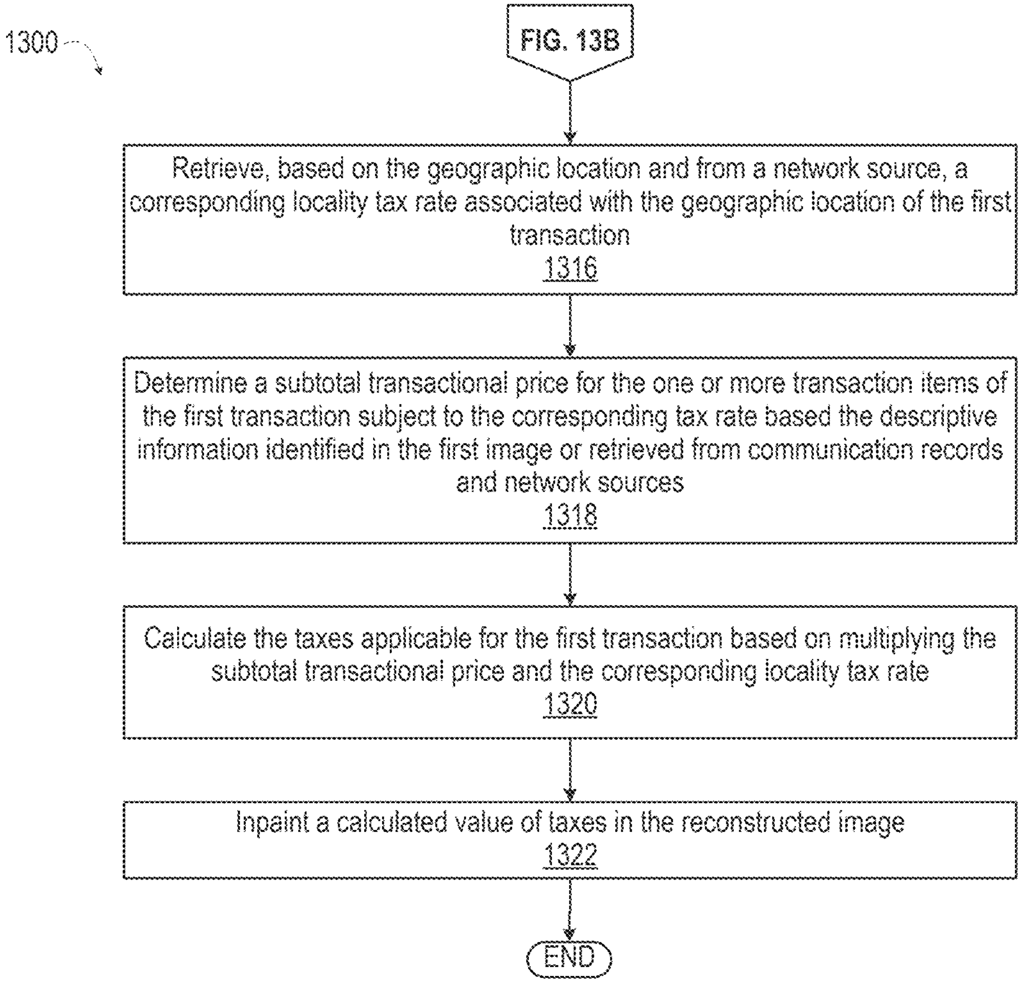

FIGS. 11A-11B (collectively "FIG. 11") are a flow diagram presenting method 1100 for image editing by reconstructing descriptive information that is obscured or was not captured in the image due to an obstruction. FIG. 12 is a flow diagram presenting method 1200 for accessing descriptive information contained in the image, communication records, second party web servers, and security access web portals. FIG. 13 (FIG. 13A-13B) is a flow diagram presenting method 1300 for identifying transaction labels and values of transaction information contained in the image, a transaction format, and network sources for reconstructing an image of a physical transaction record. Method 1200 (FIG. 12) and method 1300 (FIG. 13) may augment method 1100 (FIG. 11). The description of method 1100 (FIG. 11), method 1200 (FIG. 12), and method 1300 (FIG. 13) are provided with general reference to the specific components illustrated within the preceding FIGS. 1-10. Specific components referenced in method 1100 (FIG. 11), method 1200 (FIG. 12), and method 1300 (FIG. 13) may be identical or similar to components of the same name used in describing preceding FIGS. 1-10. In one or more embodiments, controller 120 (FIG. 1) configures communication device 100 (FIG. 1) or a similar computing device to provide the described functionality of method 1100 (FIG. 11), method 1200 (FIG. 12), and method 1300 (FIG. 13).

With reference to FIG. 11A, method 1100 includes connecting, via a communications subsystem of an electronic device, to a communication network (block 1102). Method 1100 includes monitoring for a trigger (e.g., user input to user interface or detecting photographic capture the first image using an image capturing device of the electronic device) to reconstruct a first image of a physical transaction record that is partially obscured/obstructed (e.g., including an obstructing object or surface marring) (block 1104). Method 1100 includes determining whether a trigger is detected (decision block 1106). If the trigger is not received, method 1100 returns to block 1104. In response to determining that the trigger to reconstruct a first image of a physical transaction record that is partially obscured/obstructed is received, method 1100 includes identifying at least one first portion of descriptive information on another section of the first image that is clear/unobstructed, where the first portion of descriptive information includes identifying indications of a transaction second party and at least one transaction identifying aspect (block 1108). An example of identifying labels and values of transaction categories is described below in method 1300 (FIG. 13). In one or more embodiments, method 1100 includes searching, in network sources(s) (e.g., transaction repositories, security access transaction repositories, and second party web servers), by a processor of the electronic device, for related format and descriptive information using the first portion of the descriptive information (block 1110). An example method of gaining access to unsecured transaction data and secured second party transaction data is described below in method 1200 (FIG. 12). Method 1100 includes identifying a first format of an example physical transaction record at least in part based on matching a partial format of the descriptive information to an example format of the example physical transaction record (block 1112). Method 1100 includes identifying, based on the first format, at least one category of transaction information of the descriptive information obscured in the section of the first image (block 1114). Method 1100 includes retrieving, via the communications subsystem from a network source, information corresponding to, or enabling calculation of, the at least one category of the descriptive information obscured from the first image (block 1116). Then method 1100 proceeds to delineating the first image in block 1118 (FIG. 11B).

With reference to FIG. 11B, method 1100 includes delineating the first image into multiple segments that includes at least one first segment encompassing the section with the obscurity/obstruction, and which separates the obscurity/obstruction from at least one second segment encompassing a visible and readable portion of the other section of the first image that is unobscured/unobstructed (block 1118). In one or more embodiments, method 1100 includes determining one or more of position, scale, skew, and orientation characteristic of the descriptive information in first image (block 1120).

In one or more embodiments, method 1100 includes determining a nonplanar shape of an object in the unobstructed first image upon which the at least the portion of the descriptive information is presented (block 1122). Method 1100 includes determining whether one or more of position, scale, skew, and orientation of at least a portion of the descriptive information contained in the unobstructed first image would be legible if reconstructed for the three-dimensional shape (decision block 1124). In response to determining that the descriptive information contained in the unobstructed first image would not be legible if reconstructed for the three-dimensional shape, method 1100 includes determining a two-dimensional shape of the example physical transaction record (block 1126). Method 1100 includes morphing the object in the unobstructed first image toward the two-dimensional shape sufficient to enable altering the one or more of the position, the scale, the skew, and the orientation to render legible the at least one portion of the descriptive information (block 1128). In response to determining that the descriptive information contained in the unobstructed first image would be legible if reconstructed for the nonplanar shape in decision block 1124 or after block 1128, method 1100 includes reconstructing an unobstructed first image by inpainting, in the at least one first segment of the first image, at least one second portion of descriptive information that was hidden/obscured by the obstruction in the first image, the at least one second portion of descriptive information determined based on the information retrieved from the network source (e.g., transaction repository, security access transaction repository, or second party web server) (block 1130). In an example, the network source may be identified based on a business name, a business address, a business telephone number, a business email address, or a business logo at least partially visible in the first image. An example is described below with regard to method 1200 of FIG. 12. In one or more embodiments, method 1100 includes inpainting the at least one first segment by altering corresponding one or more of position, scale, skew, and orientation of the retrieved descriptive information obscured from the first the image due to the obstruction to match a corresponding characteristic of the first image (block 1132). Then method 1100 ends.

According to aspects of the present disclosure, method 1100 may include connecting, via a communications subsystem of an electronic device, to a communication network. In response to a trigger to reconstruct a first image of a physical transaction record that is partially obstructed, method 1100 includes identifying in the first image an obstruction that is obfuscating a section of the first image. Method 1100 includes identifying at least one first portion of descriptive information on another section of the first image that is unobstructed. The descriptive information includes identifying indications of a transaction second party and at least one transaction identifying aspect. Method 1100 includes identifying a first format of an example physical transaction record, at least in part based on matching a partial format of the descriptive information to an example format of the example physical transaction record. Method 1100 includes identifying, based on the first format, at least one category of transaction information of the descriptive information obscured in the section of the first image. Method 1100 includes retrieving, via the communications subsystem from a network source, information corresponding to, or enabling calculation of, the at least one category of the descriptive information obscured from the first image due to the obstruction. Method 1100 includes delineating the first image into multiple segments including at least one first segment encompassing the section with the obstruction, and which separates the obstruction from at least one second segment encompassing a visible portion of the other section of the first image that is unobstructed. Method 1100 includes reconstructing an unobstructed first image by inpainting, in the at least one first segment of the first image, at least one second portion of descriptive information that was hidden by the obstruction in the first image, the at least one second portion of descriptive information determined based on the information retrieved from the network source.

In one or more embodiments, method 1100 may further include identifying, in part based on the first format, one of a label category and an associated value category as the at least one category of transaction information of the descriptive information that is at least partially unobscured in the other section of the first image. Method 1100 may further include retrieving, via the communications subsystem from the network source, the other one of the label category and the associated category value of the descriptive information that is at least partially obscured from the first image due to the obstruction.

In one or more embodiments, method 1100 may further include photographically capturing the first image using an image capturing device of the electronic device. Capturing the first image is the activation trigger prior to the trigger to reconstruct the first image.

In one or more embodiments, in response to determining that the descriptive information in the section of the first image identifies a user of the electronic device as a transaction first party to an online transaction portal, method 1100 may further include obtaining login credentials associated with the user of the electronic device corresponding to the transaction portal. Method 1100 may further include accessing the network source using the login credentials. Method 1100 may further include retrieving the transaction information corresponding to the descriptive information that is obscured.

In one or more embodiments, retrieving the information from at least one category of transaction information includes extracting information for one or more categories from among a group including: (i) a name; (ii) a website; (iii) an email address; (iii) a logo; (iv) a transaction identifier; (v) a transaction date; (vi) at least one transacted item; (vii) a corresponding transactional price associated with each of the at least one transacted item; (viii) taxes for the first transaction; (ix) a tax rate for the at least one transacted item; (x) a shipping/delivery/processing cost for the first transaction; and (xi) mathematical combination of the transactional price and accompanying costs for the at least one transacted item.

In one or more embodiments, method 1100 may further include determining a location of the first transaction based on one or more detail within the descriptive information. Method 1100 may further include determining, based on the location, a corresponding locality tax rate associated with a location of the first transaction. Method 1100 may further include determining the taxes applicable for the first transaction by calculating a locality tax using a transaction total and the locality tax rate. Method 1100 may further include inpainting at least one of the locality tax and a calculated total cost with applied tax that is obscured in the first image.

In one or more embodiments, method 1100 may further include determining one or more of position, scale, skew, and orientation characteristic of the descriptive information in first image. Method 1100 may further include inpainting the at least one first segment by altering corresponding one or more of position, scale, skew, and orientation of the retrieved descriptive information obscured from the first the image due to the obstruction to match a corresponding characteristic of the first image.

In one or more particular embodiments, in response to determining that one or more of position, scale, skew, and orientation of at least a portion of the descriptive information contained in the unobstructed first image is not legible, method 1100 may further include determining a nonplanar shape of an object in the unobstructed first image upon which the at least the portion of the descriptive information is presented. Method 1100 may further include determining a two-dimensional shape of the example physical transaction record. Method 1100 may further include morphing the object in the unobstructed first image toward the two-dimensional shape sufficient to enable altering the one or more of the position, the scale, the skew, and the orientation to render legible the at least one portion of the descriptive information. In one or more embodiments, method 1100 further includes identifying an object in the obstructed first image upon which the descriptive information is presented. The obstruction is or can include a surface marring of the object.

With reference to FIG. 12, method 1200 may further include identifying, by the processor of the electronic device, descriptive information contained in the first image associated with a transaction (block 1202). Method 1200 may further include attempting to identify, based on the descriptive information, a transaction second party associated with the transaction (block 1204). Method 1200 may further include searching for and retrieving, in local storage of the electronic device, in a communications network, and publicly accessible second party web servers, for additional descriptive information (e.g., format & content) associated with, but missing from, the descriptive information from the first image (block 1206). Method 1200 may further include attempting to identify in the descriptive information, both contained in the first image and retrieved from the search, an indication that the user is identified with an online account identifier for a security access transaction portal having more descriptive information for the transaction (block 1208). Method 1200 may further include determining whether an indication is found that the online account identifier exists (block 1210). In response to determining that an indication is found that the online account identifier does not exist, method 1200 ends. In response to determining that an indication that the online account identifier does exist is found, method 1200 may further include searching, in network sources(s), communication record(s), or applications on electronic device, for the secured access transaction portal associated with the transaction second party to the transaction (block 1212). Method 1200 may further include searching, in communication record(s) and/or applications on electronic device, for user login credentials (e.g., online login identifier and password) for accessing the secured access transaction portal (block 1214). Method 1200 may further include determining whether the login credentials are found for the online account (block 1216). In response to determining that the login credential(s) are not found for the online account, method 1200 includes prompting user input for the user login credentials not found in the network sources(s), communication record(s), or applications (block 1218). In response to determining that the login credential(s) are found for the online account in decision block 1216 or after block 1218, method 1200 may further include accessing the network source (i.e., security access transaction portal) using the login credentials to retrieve missing descriptive information (e.g., format & content) (block 1220). Then method 1200 ends.

With reference to FIG. 13A, method 1300 may further include identifying, in part based on the first format, one of a label category and an associated value category as the at least one category of transaction information of the descriptive information at least partially unobscured in the other section of the first image (block 1302). Method 1300 may further include retrieving, via the communications subsystem from the network source, the other one of the label category and the associated category value of the descriptive information at least partially obscured from the first image due to the obstruction (block 1304). In one or more embodiments, method 1200 may further include identifying, in the at least one first portion of the descriptive information on the other section of the first image, the at least one transaction identifying aspect comprising transaction related labels and values (block 1302). Method 1300 includes identifying the first format of the example physical transaction record that corresponds to the other transaction related labels and values and to the transaction second party (block 1304). In one or more embodiments, method 1300 includes identifying one or more transaction labels and values that are missing as being at least partially obscured based on the descriptive information of the first image and the first format of the example physical transaction record (block 1306). In one or more embodiments, method 1300 may further include identifying the one or more transaction labels and values corresponding to transaction categories from among a group comprising: (i) a name; (ii) a website; (iii) an email address; (iii) a logo; (iv) a transaction identifier; (v) a transaction date; (vi) at least one transacted item; (vii) a corresponding transactional price associated with each of the at least one transacted item; (viii) taxes for the first transaction; (ix) a tax rate for the at least one transacted item; (x) a shipping/delivery/processing cost for the first transaction; and (xi) mathematical combination of the transactional price and accompanying costs for the at least one transacted item (block 1308). As described above with regard to method 1100 (FIG. 11) and method 1200 (FIG. 12), method 1300 may further include attempting to retrieve one or more missing labels and values from communication records and/or network sources (block 1310). In a particular one or more embodiments, method 1300 includes determining whether a value for taxes for the first transaction remains missing after attempting to retrieve the one or more missing labels and values (decision block 1312). In response to determining that the value of taxes is not missing, method 1300 ends.

In response to determining that the value of taxes remains missing, method 1300 includes determining a geographic location of the first transaction based the descriptive information identified in the first image or retrieved from communication records and network sources (block 1314). Then method 1300 proceeds to block 1316 (FIG. 13B). Method 1200 includes retrieving, based on the geographic location and from a network source, a corresponding locality tax rate associated with the geographic location of the first transaction (block 1316). Method 1300 includes determining a subtotal transactional price for the one or more transaction items of the first transaction subject to the corresponding tax rate based the descriptive information identified in the first image or retrieved from communication records and network sources (block 1318). Method 1300 includes calculating the taxes applicable for the first transaction based on multiplying the subtotal transactional price and the corresponding locality tax rate (block 1320). Method 1300 includes inpainting a calculated value of taxes in the reconstructed image (block 1322). Then method 1300 ends.

According to aspects of the present disclosure, the communication device 100 (FIG. 1), method 1100 (FIG. 11), method 1200 (FIG. 12), and method 1300 (FIG. 13) and computer program product, such as RSD 150 (FIG. 1), provides techniques for enabling reconstruction of descriptive information that was not captured in the image due to an obstruction or that has been otherwise obscured so as to not be visually discernible/decipherable. Aspects of the disclosure further enables completer and more natural looking image editing by modifying formatting of inpainted descriptive content to align with the remaining information within the image. Conventional photo editing software relies upon information only within the image for reconstructing a realistic background within the erased portion. In particular, text that is partially erased creates a glaring inaccuracy. In the present disclosure, the descriptive information is retrieved from another source and incorporated into the image to achieve a realistic and accurate reconstruction.

Aspects of the present innovation are described above with reference to flowchart illustrations and/or block diagrams of methods, apparatus (systems) and computer program products according to embodiments of the innovation. It will be understood that each block of the flowchart illustrations and/or block diagrams, and combinations of blocks in the flowchart illustrations and/or block diagrams, can be implemented by computer program instructions. These computer program instructions may be provided to a processor of a general-purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks.

As will be appreciated by one skilled in the art, embodiments of the present innovation may be embodied as a system, device, and/or method. Accordingly, embodiments of the present innovation may take the form of an entirely hardware embodiment or an embodiment combining software and hardware embodiments that may all generally be referred to herein as a "circuit," "module" or "system."

While the innovation has been described with reference to exemplary embodiments, it will be understood by those skilled in the art that various changes may be made, and equivalents may be substituted for elements thereof without departing from the scope of the innovation. In addition, many modifications may be made to adapt a particular system, device, or component thereof to the teachings of the innovation without departing from the essential scope thereof. Therefore, it is intended that the innovation is not limited to the particular embodiments disclosed for carrying out this innovation, but that the innovation will include all embodiments falling within the scope of the appended claims. Moreover, the use of the terms first, second, etc. do not denote any order or importance, but rather the terms first, second, etc. are used to distinguish one element from another.

The terminology used herein is for the purpose of describing particular embodiments only and is not intended to be limiting of the innovation. As used herein, the singular forms "a", "an" and "the" are intended to include the plural forms as well, unless the context clearly indicates otherwise. It will be further understood that the terms "comprise" and/or "comprising," when used in this specification, specify the presence of stated features, integers, steps, operations, elements, and/or components, but do not preclude the presence or addition of one or more other features, integers, steps, operations, elements, components, and/or groups thereof.

The corresponding structures, materials, acts, and equivalents of all means or step plus function elements in the claims below are intended to include any structure, material, or act for performing the function in combination with other claimed elements as specifically claimed. The description of the present innovation has been presented for purposes of illustration and description but is not intended to be exhaustive or limited to the innovation in the form disclosed. Many modifications and variations will be apparent to those of ordinary skill in the art without departing from the scope and spirit of the innovation. The embodiments were chosen and described in order to best explain the principles of the innovation and the practical application, and to enable others of ordinary skill in the art to understand the innovation for various embodiments with various modifications as are suited to the particular use contemplated.

What is claimed is:

1. An electronic device comprising:
- a memory that stores an image obstruction mitigation module and at least one communication application;
- a communications subsystem connectable to a communication network; and
- a processor communicatively coupled to the memory and the communications subsystem, and which is configured to cause the electronic device to:
  - in response to a trigger to reconstruct a first image of a physical transaction record having content that is partially obstructed:
  - identify in the first image an obstruction obfuscating a section of the first image;
  - identify at least one first portion of descriptive information on another section of the first image that is unobstructed, the descriptive information comprising identifying indications of a transaction second party and at least one transaction identifying aspect;
  - identify a first format of an example physical transaction record, at least in part based on matching a partial format of the descriptive information to an example format of the example physical transaction record;
  - identify, based on the first format, at least one category of transaction information of the descriptive information obscured in the section of the first image;
  - retrieve, via the communications subsystem from a network source, information corresponding to, or enabling determination of, the at least one category of the descriptive information obscured from the first image due to the obstruction;
  - delineate the first image into multiple segments comprising at least one first segment encompassing the section with the obstruction, and which separates the obstruction from at least one second segment encompassing a visible portion of the other section of the first image that is unobstructed; and
  - reconstruct an unobstructed first image by inpainting, in the at least one first segment of the first image, at least one second portion of descriptive information that was hidden by the obstruction in the first image, the at least one second portion of descriptive information determined based on the information retrieved from the network source.

2. The electronic device of claim 1, wherein the processor is further configured to cause the electronic device to:
- identify, in part based on the first format, one of a label category and an associated value category as the at least one category of transaction information of the descriptive information at least partially unobscured in the other section of the first image; and retrieve, via the communications subsystem from the network source, the other one of the label category and the associated category value of the descriptive information that is at least partially obscured from the first image due to the obstruction.

3. The electronic device of claim 1, further comprising an image capturing device communicatively coupled to the processor, and wherein the processor is further configured to cause the electronic device to:

photographically capture the first image using the image capturing device, in response to an activation trigger;

determine, via an AI module scanning the captured first image, that at least one portion of alphanumeric information is obscured by an object in front of the at least one portion of the capture first image; and generate a prompt with selectable option to trigger activation of the reconstruction of the first image.

4. The electronic device of claim 1, wherein the processor is further configured to cause the electronic device to:

in response to determining that the descriptive information in the section of the first image identifies a user of the electronic device as a transaction first party to an online transaction portal:

obtain login credentials associated with the user of the electronic device corresponding to the transaction portal;

access the network source using the login credentials; and retrieve the transaction information corresponding to the descriptive information that is obscured.

5. The electronic device of claim 4, wherein, in retrieving the information from at least one category of transaction information, the processor is configured to cause the electronic device to extract information for one or more categories from among a group comprising: (i) a name; (ii) a website; (iii) an email address; (iii) a logo; (iv) a transaction identifier; (v) a transaction date; (vi) at least one transacted item; (vii) a corresponding transactional price associated with each of the at least one transacted item; (viii) taxes for the first transaction; (ix) a tax rate for the at least one transacted item; (x) a shipping/delivery/processing cost for the first transaction; and (xi) mathematical combination of the transactional price and accompanying costs for the at least one transacted item.

6. The electronic device of claim 4, wherein the processor is further configured to:

determine a location of the first transaction based on one or more detail within the descriptive information;

determine, based on the location, a corresponding locality tax rate associated with a location of the first transaction;

determine the taxes applicable for the first transaction by calculating a local tax using a transaction total and the locality tax rate; and inpaint at least one of the local tax and a calculated total cost with applied tax that is obscured in the first image.

7. The electronic device of claim 4, wherein the processor is configured to cause the electronic device:

determine one or more of position, scale, skew, and orientation characteristic of the descriptive information in first image;

alter corresponding one or more of position, scale, skew, and orientation of the retrieved descriptive information obscured from the first the image due to the obstruction to generate an altered version of the retrieved descriptive information having a format that matches a corresponding characteristic of the first image; and inpaint the at least one first segment using the altered version of the retrieved descriptive information.

8. The electronic device of claim 7, wherein the processor is configured to cause electronic device to:

in response to determining that one or more of position, scale, skew, and orientation of at least a portion of the descriptive information contained in the unobstructed first image is not legible:

determine a nonplanar shape of an object in the first image upon which the at least the portion of the descriptive information is presented;

determine a planar shape of the example physical transaction record; and morph the object in the unobstructed first image toward the planar shape sufficient to enable altering the one or more of the position, the scale, the skew, and the orientation to render legible the at least the portion of the descriptive information.

9. The electronic device of claim 1, wherein the obstruction comprises a surface marring.

10. A method comprising:

connecting, via a communications subsystem of an electronic device, to a communication network; and in response to a trigger to reconstruct a first image of a physical transaction record that is partially obstructed:

identifying in the first image an obstruction obfuscating a section of the first image;

identifying at least one first portion of descriptive information on another section of the first image that is unobstructed, the descriptive information comprising identifying indications of a transaction second party and at least one transaction identifying aspect;

identifying a first format of an example physical transaction record at least in part based on matching a partial format of the descriptive information to an example format of the example physical transaction record;

identifying, based on the first format, at least one category of transaction information of the descriptive information obscured in the section of the first image;

retrieving, via the communications subsystem from a network source, information corresponding to, or enabling calculation of, the at least one category of the descriptive information obscured from the first image due to the obstruction;

delineating the first image into multiple segments comprising at least one first segment encompassing the section with the obstruction, and which separates the obstruction from at least one second segment encompassing a visible portion of the other section of the first image that is unobstructed; and reconstructing an unobstructed first image by inpainting, in the at least one first segment of the first image, at least one second portion of descriptive information that was hidden by the obstruction in the first image, the at least one second portion of descriptive information determined based on the information retrieved from the network source.

11. The method of claim 10, further comprising:

identifying, in part based on the first format, one of a label category and an associated value category as the at least one category of transaction information of the descriptive information at least partially unobscured in the other section of the first image; and retrieving, via the communications subsystem from the network source, the other one of the label category and the associated category value of the descriptive information at least partially obscured from the first image due to the obstruction.

12. The method of claim 10, further comprising:

in response to an activation trigger prior to the trigger to reconstruct the first image, photographically capturing the first image using an image capturing device of the electronic device.

13. The method of claim 10, further comprising:

in response to determining that the descriptive information in the section of the first image identifies a user of the electronic device as a transaction first party to an online transaction portal:

obtaining login credentials associated with the user of the electronic device corresponding to the transaction portal;

accessing the network source using the login credentials; and retrieving the transaction information corresponding to the descriptive information that is obscured.

14. The method of claim 13, wherein retrieving the information from at least one category of transaction information comprises extracting information for one or more categories from among a group comprising: (i) a name; (ii) a website; (iii) an email address; (iii) a logo; (iv) a transaction identifier; (v) a transaction date; (vi) at least one transacted item; (vii) a corresponding transactional price associated with each of the at least one transacted item; (viii) taxes for the first transaction; (ix) a tax rate for the at least one transacted item; (x) a shipping/delivery/processing cost for the first transaction; and (xi) mathematical combination of the transactional price and accompanying costs for the at least one transacted item.

15. The method of claim 13, further comprising:

determining a location of the first transaction based on one or more detail within the descriptive information;

determining, based on the location, a corresponding locality tax rate associated with a location of the first transaction;

determining the taxes applicable for the first transaction by calculating a locality tax using a transaction total and the locality tax rate; and inpainting at least one of the locality tax and a calculated total cost with applied tax that is obscured in the first image.

16. The method of claim 13, further comprising:

determining one or more of position, scale, skew, and orientation characteristic of the descriptive information in first image; and inpainting the at least one first segment by altering corresponding one or more of position, scale, skew, and orientation of the retrieved descriptive information obscured from the first the image due to the obstruction to match a corresponding characteristic of the first image.

17. The method of claim 16, further comprising:

in response to determining that one or more of position, scale, skew, and orientation of at least a portion of the descriptive information contained in the unobstructed first image is not legible:

determining a nonplanar shape of an object in the unobstructed first image upon which the at least the portion of the descriptive information is presented;

determining a planar shape of the example physical transaction record; and morphing the object in the unobstructed first image toward the planar sufficient to enable altering the one or more of the position, the scale, the skew, and the orientation to render legible the at least the portion of the descriptive information.

18. The method of claim 10, wherein the obstruction comprises an area of surface marring.

19. A computer program product comprising:

a computer readable storage device; and program code on the computer readable storage device that when executed by a processor associated with an electronic device, the program code is configured to cause the electronic device to provide functionality of:

connecting, via a communications subsystem of the electronic device, to a communication network; and in response to a trigger to reconstruct a first image of a physical transaction record that is partially obstructed:

identifying in the first image an obstruction obfuscating a section of the first image;

identifying at least one first portion of descriptive information on another section of the first image that is unobstructed, the descriptive information comprising identifying indications of a transaction second party and at least one transaction identifying aspect;

identifying a first format of an example physical transaction record at least in part based on matching a partial format of the descriptive information to an example format of the example physical transaction record;

identifying, based on the first format, at least one category of transaction information of the descriptive information obscured in the section of the first image;

retrieving, via the communications subsystem from a network source, information corresponding to, or enabling calculation of, the at least one category of the descriptive information obscured from the first image due to the obstruction;

delineating the first image into multiple segments comprising at least one first segment encompassing the section with the obstruction, and which separates the obstruction from at least one second segment encompassing a visible portion of the other section of the first image that is unobstructed; and reconstructing an unobstructed first image by inpainting, in the at least one first segment of the first image, at least one second portion of descriptive information that was hidden by the obstruction in the first image, the at least one second portion of descriptive information determined based on the information retrieved from the network source.

20. The computer program product of claim 19, wherein the program code is further configured to cause the electronic device to provide functionality of:

identifying, in part based on the first format, one of a label category and an associated value category as the at least one category of transaction information of the descriptive information at least partially unobscured in the other section of the first image; and retrieving, via the communications subsystem from the network source, the other one of the label category and the associated category value of the descriptive information at least partially obscured from the first image due to the obstruction.

* * * * *